(12) United States Patent
Ahmed et al.

(10) Patent No.: US 10,303,195 B2
(45) Date of Patent: May 28, 2019

(54) APPARATUS AND METHOD FOR VOLTAGE BALANCING AND OPTIMIZING OUTPUT POWER IN POWER GENERATION SYSTEMS

(71) Applicants: Shehab Ahmed, Doha (QA); Ahmed A. Elserougi, Doha (QA); Ahmed M. Massoud, Doha (QA); Ahmed Salah Morsy, College Station, TX (US)

(72) Inventors: Shehab Ahmed, Doha (QA); Ahmed A. Elserougi, Doha (QA); Ahmed M. Massoud, Doha (QA); Ahmed Salah Morsy, College Station, TX (US)

( * ) Notice: Subject to any disclaimer, the term of this patent is extended or adjusted under 35 U.S.C. 154(b) by 0 days.

(21) Appl. No.: 15/521,280

(22) PCT Filed: Nov. 6, 2015

(86) PCT No.: PCT/US2015/059538
§ 371 (c)(1),
(2) Date: Apr. 21, 2017

(87) PCT Pub. No.: WO2016/073893
PCT Pub. Date: May 12, 2016

(65) Prior Publication Data
US 2017/0308110 A1  Oct. 26, 2017

Related U.S. Application Data

(60) Provisional application No. 62/077,037, filed on Nov. 7, 2014.

(51) Int. Cl.
*H02J 7/00* (2006.01)
*H01M 10/44* (2006.01)
(Continued)

(52) U.S. Cl.
CPC .............. *G05F 1/67* (2013.01); *H02J 1/00* (2013.01); *H02J 1/10* (2013.01); *H02J 3/38* (2013.01);
(Continued)

(58) Field of Classification Search
CPC ........................................................ G05F 1/67
(Continued)

(56) References Cited

U.S. PATENT DOCUMENTS 9,236,743 B2  1/2016  Ahmed et al.
2008/0116850 A1  5/2008  Konishi et al.
(Continued)

FOREIGN PATENT DOCUMENTS

JP         4491622        6/2010
WO    WO 2010/067735    6/2010

OTHER PUBLICATIONS

Bellini et al., "MPPT Algorithm for Current Balancing of Partially Shaded Photovoltaic Modules", IEEE, pp. 933-938, 2010.
(Continued)

*Primary Examiner* — Edward Tso
*Assistant Examiner* — Ahmed H Omar
(74) *Attorney, Agent, or Firm* — Richard C. Litman

(57) ABSTRACT

Voltage balancing and extracted output power circuit topologies use maximum power point and maximum power point tracking to provide voltage balancing and voltage and current adjustment to optimize extracted output power for corresponding DC voltage source strings (120a, 130a). The topologies used to control power generation include one or more voltage balancing circuits and/or power system optimizer circuits (102a) to reduce decreased power utilization and enable independent operating voltages of DC voltage source strings (120a, 130a) to provide voltage balancing and to deliver a maximum power independent of the voltage and (Continued)

current of other DC voltage source strings (120a, 130a). The current flowing in each DC voltage source string is controlled by the duty ratio of the corresponding switch (101a, 108a). The circuit topologies can include a plurality of voltage balancing/power system optimizer circuits (102a).

12 Claims, 17 Drawing Sheets

(51) Int. Cl.
*G05F 1/67* (2006.01)
*H02J 1/10* (2006.01)
*H02J 3/38* (2006.01)
*H02J 1/00* (2006.01)

(52) U.S. Cl.
CPC ......... *H02J 3/385* (2013.01); *H02J 2001/106* (2013.01); *Y02E 10/58* (2013.01)

(58) Field of Classification Search
USPC ......................................................... 320/101
See application file for complete search history.

(56) References Cited

U.S. PATENT DOCUMENTS

| | | |
|---|---|---|
| 2010/0289338 A1 | 11/2010 | Stauth |
| 2011/0115297 A1 | 5/2011 | De Waal et al. |
| 2011/0140532 A1 | 6/2011 | Cherukupalli |
| 2011/0279085 A1 | 11/2011 | Shigemizu |
| 2012/0049833 A1* | 3/2012 | Chang .................... H02J 3/385 |
| | | 323/311 |
| 2012/0104863 A1 | 5/2012 | Yuan |
| 2012/0187766 A1 | 7/2012 | Cleland |
| 2012/0255591 A1 | 10/2012 | Arditi et al. |
| 2013/0026839 A1 | 1/2013 | Grana |
| 2013/0026842 A1 | 1/2013 | Arditi et al. |
| 2013/0026843 A1 | 1/2013 | Arditi et al. |
| 2013/0033113 A1 | 2/2013 | Huang et al. |
| 2015/0144176 A1 | 5/2015 | Chang |

OTHER PUBLICATIONS

Shenoy et al., "Differential Power Processing for Increased Energy Production and Reliability of Photovoltaic Systems", IEEE Transactions on Power Electronics, vol. 28, No. 6, pp. 2968-2979, Jun. 2013.

Qin et al., "Sub-Module Differential Power Processing for Photovoltaic Applications", IEEE, pp. 101-108, 2013.

Morsy et al., A New Approach for Increasing Energy Harvest in Large Scale PV Plants Employing a Novel Voltage Balancing Topology, 6 pages, distributed Nov. 2013, IECON Conference, Nov. 10-13, 2013.

* cited by examiner

APPARATUS AND METHOD FOR VOLTAGE BALANCING AND OPTIMIZING OUTPUT POWER IN POWER GENERATION SYSTEMS

TECHNICAL FIELD

The present invention relates to renewable energy sources, and particularly to apparatuses and methods for a voltage balancing topology, as well as an extracted output power optimizer circuit topology to optimize extracted output power from a corresponding string, coupled with renewable energy sources using maximum power point tracking and control of power generation, such as for photovoltaic (PV) systems, PV power plants, wind turbine power generation systems, and the like.

BACKGROUND ART

Photovoltaic power generation is in the forefront of rapidly growing industries, scoring high growth rates globally. In the US, PV installations grew 109% in 2011 to reach 1,855 megawatts (MW) which represents 7.0% of all PV globally. PV installations can be divided between three market segments, namely residential, commercial and utility. Utility installations typically exhibit the largest growth among these market segments. This significant growth is encouraged by the continuous drop in PV costs.

PV modules are generally characterized by their nonlinear voltage-current (I-V) relation that is significantly affected by external environmental factors like solar irradiance and temperature, such as illustrated in the graph 600a of FIG. 6A, in conjunction with other factors like aging and module mismatch. Among these factors, shading is usually the most critical player affecting energy harvest from PV modules. As depicted in the graph 600a in FIG. 6A, the PV module current significantly drops at low irradiance levels that can be caused by shading. Maximum power is obtained only at a specific value of current for a given irradiance, as indicated from FIG. 6A. It is a purpose of the Maximum Power Point Tracking (MPPT) controller to harvest a maximum power from the PV module for any of various given environmental conditions.

Most PV modules deliver power at low voltages, typically 25-35 volts for most crystalline silicon modules and 50-100 volts for most thin-film modules. Therefore, it is generally required to build up an acceptable voltage level either by series connection of PV modules, or by voltage-boosting of parallel connected modules via a power electronic stage that can raise the system cost and can reduce its efficiency. Thus, constructing strings of series connected modules is the dominant design choice in most PV systems especially for commercial and utility scales. These strings can be grouped in parallel to one large central inverter, or each string can be connected to a string inverter.

Since the inverter efficiency generally increases with its power rating, central inverters can be more efficient in power conversion than all other alternatives, i.e. string inverters (96% efficiency) and Module Integrated Converters (MIC) (94% efficiency), for example. Additionally, the inverter cost per kilowatt (kW) generally decreases with increasing the inverter size and, hence, a central inverter can offers the relatively cheapest solution. Conversely, from the perspective of the amount of extracted output power from a given PV plant, due to modules mismatch and environmental effects like partial shading, central inverters typically extract less energy compared to string inverters and MIC, respectively. Nevertheless, central inverters still prove to be a dominant candidate for large PV installations as to its relatively better gross economics, despite the technological competition of string inverters.

In large PV power plants, PV modules are typically connected in series to create strings with the desired peak direct current (DC) voltage. As previously mentioned, these strings are usually connected in parallel and fed to one large central grid-connected inverter that converts DC to alternating current (AC), such as illustrated in FIG. 5, for example. FIG. 5 is a schematic diagram illustrating a power generation system 500 including photovoltaic (PV) arrays of a plurality of DC voltage source strings, such as DC voltage source string 510 and 520. The DC voltage source string 510 includes a plurality of PV panels 512 each panel being associated with a bypass diode 515 and including a reverse blocking diode 518. The DC voltage source string 520 includes a plurality of PV panels 522 each panel being associated with a bypass diode 525 and including a reverse blocking diode 528. A central inverter 530 receives the DC voltage generated by the DC voltage source strings 510 and 520 and converts the received DC voltage to an alternating current (AC) voltage, for example.

A series connection of modules generally dictates the flowing of the same or substantially the same current in all modules. Nevertheless, if a module is shaded, its current providing capacity can be reduced and, in such case, it is usually protected from the high current of the series unshaded modules through a bypass diode. For a partially shaded string, a decision to work at one of two operating conditions can be made. For example, a foremost operating condition of the partially shaded string is to let the string perform at the level of the poorest performer in the string, i.e. the low current of the shaded module dictates the current of the whole string so that all modules are producing power, i.e. no modules are shorted by their bypass diodes and, thus, the string voltage does not collapse. A second operating condition of the partially shaded string is to operate the string at the relatively high current of the unshaded modules and sacrificing the shaded ones, i.e. the shaded modules are shorted by their bypass diodes. From the overall string power perspective, this second operating condition option is usually better than operating the whole string at low current of the shaded modules.

Referring to FIG. 6B, in a graph 600b of this figure there is illustrated the second operating condition and shows that a maximum power of a DC voltage source string is obtained at lower string voltage, i.e. at higher string current. In this regard, the graph 600b of FIG. 6B shows, for example, the power-voltage relation of a string of 20 series panels with different numbers of shaded panels that receive a reduced irradiance of S=200 watts/meter$^2$ (W/m$^2$), and the unshaded panels receive the rated irradiance of S=1000 W/m$^2$.

Unfortunately, a partially shaded string operating at its maximum power point with a reduced voltage typically fails to connect in parallel with the unshaded strings operating at a higher voltage. Such parallel connection usually can result in one of two unwanted conditions, namely either operating the parallel strings at a higher voltage assuring maximum power yield from the unshaded strings and sacrificing a significant amount of available power from the partially shaded string or operating the parallel strings at lower voltage to assure a maximum power yield from the shaded string and sacrificing a significant amount of available, but unutilized, power from the unshaded strings. Logically, typically the unshaded strings tip the scale towards operating at a higher voltage to maximize the overall power from the PV plant.

As seen in the graph 600b of FIG. 6B, parallel connection of a partially shaded string to other strings generally results in reduced extracted output power from the partially shaded string if operated at a maximum power point (MPP) voltage of the parallel non-shaded strings. FIG. 6C shows in a graph 600c the percentage of unutilized power from the shaded string when operating at the voltage corresponding to a maximum power of the unshaded strings. The curves are at different insolation values (S=0, 200, 400, 600 W/m$^2$) for the shaded modules and at different percentages of shaded modules per string.

For various PV modules from different manufacturers, the voltage at maximum power point is typically about 80% of the open circuit voltage of a PV module. Consequently, it can be noted that, when about 20% of a string of a series PV modules is completely shaded, the shaded string voltage is usually below the maximum power point voltage ($V_{MPP}$) of the unshaded strings, such that $V_{Open\ Circuit}^{20\%\ shaded\ string} < V_{MPP}^{un\text{-}shaded\ string}$, for example. Thus, no power from the shaded string usually can be harvested at this voltage and 100% of the available power of the shaded string is lost, such as indicated by the graph 600c of FIG. 6C, for example. Traditionally, in order to protect a shaded string from a reverse current caused by this voltage difference each string is serially connected with a blocking diode. Table 1 below shows for different PV manufactures that $V_{MPP}/V_{Open\ Circuit} \approx 80\%$, for example.

TABLE 1

MANUFACTURERS' DATA OF SOME PV MODULES:

| Module | $V_{MPP}$ | $V_{Open\ Circuit}$ | 100% * (1 − $V_{MPP}/V_{Open\ Circuit}$) |
|---|---|---|---|
| Sharp 175 W | 35.4 | 44.4 | 20.3% |
| First Solar 75 W | 68.2 | 89.6 | 23.9% |
| Signet 360 W | 146.4 | 187.6 | 22% |

Thus, from the above description and Table 1, it can be explained and understood as to why a complete shading of 20% of the string can lead to 100% unutilized power from the partially shaded strings, as is also indicated from the illustration of FIG. 6C of the unutilized power in a partially shaded string of DC voltage sources, such as including PV panels, for example.

While current available solutions can assist in overcoming low energy yield of central inverters, typically such solutions are at the expense of decreased conversion efficiency and increased system cost. For example, while a string inverter can be one viable alternative, it is not necessarily an economical solution. Another possible alternative is using a DC-DC converter (a boost converter, for example) for each string to manipulate voltages of different strings independently to maximize the power from each of the different strings. However, use of such DC-DC converter typically can require the DC-DC converter to be rated with the full DC bus voltage and full string power, with a consequently relatively higher system cost and increased power losses can also be introduced.

It would therefore be desirable to have a balancing circuit topology, as well as an extracted output power optimizer circuit topology to optimize extracted output power from a corresponding string, and control that can integrate with conventional central-inverter-based PV installations in order to increase their energy harvest. Additionally, it would be desirable for such balancing circuit topology to have a relatively small power rating of power electronic switches and passive elements, to provide a relatively lost cost, as well as have the ability to minimize power losses and have a relatively long lifetime operation.

Thus, apparatuses and methods for a voltage balancing topology coupled with renewable energy sources using maximum power point tracking and control of power generation addressing the aforementioned problems is desired.

DISCLOSURE OF INVENTION

Embodiments of apparatuses and methods for voltage balancing topologies, as well as embodiments of apparatuses and methods for extracted output power optimizer circuit topologies to optimize extracted output power from a corresponding DC voltage source string, are coupled with renewable energy sources using maximum power point tracking and control of power generation include voltage balancing circuits, as well as extracted output power optimizer circuits, to reduce decreased power utilization of parallel operation of strings, such as in case of partial shading for PV string arrays, to enable independent operating voltages of the strings, as well as control of the current flowing in corresponding DC voltage source strings. By utilizing maximum power point tracking (MPPT) control, each string of DC voltage sources can deliver a maximum power independent of the voltage of other strings of DC voltage sources. Embodiments of voltage balancing circuits and extracted output power optimizer circuits can include a reverse blocking switch, such as a metal-oxide semiconductor field effect transistor (MOSFET), and a current flowing in each DC voltage source string is controlled by the duty ratio of the corresponding reverse blocking switch. Also, a voltage difference between DC voltage source strings can be constructed across a corresponding filter capacitor associated with at least one DC Voltage source string.

Also, in embodiments of voltage balancing and extracted output power optimizer circuits, each leg of a voltage balancing and extracted output power optimizer circuit is associated with a reverse blocking switch to control the average string current, a capacitor to filter out the high frequency current due to switching and an inductor to minimize the ripple current flowing in the corresponding DC voltage source string. Also, to provide current continuity of the inductor currents and capacitor voltage, the switches are alternatively or selectively turned on and off, so that the sum of their duty ratios, such as $\delta_1+\delta_2$, for example, =1.

Additionally, embodiments of voltage balancing circuits and extracted output power optimizer circuits can include a plurality of voltage balancing circuits and extracted output power optimizer circuits, such as can be arranged in a cascaded interconnecting relation, to extend the present voltage balancing or extracted output power optimizing topologies and methods to a large number of DC voltage source strings, based on voltage balancing or extracted output power optimizer circuits and topologies each arranged in conjunction with a corresponding group of DC voltage source strings, such as a pair of DC voltage source strings or a corresponding group of at least three DC voltage source strings, such as for voltage balancing or control of current flow of the corresponding DC voltage source strings associated with a corresponding group of DC voltage source strings.

Also, embodiments of methods for voltage balancing and extracting output power from a plurality of parallel arranged DC voltage source strings in a power generation system include controlling by a controller including a processor an operation of at least one voltage balancing and extracted output power optimizer circuit to selectively adjust a voltage generated by and to selectively control a current flowing in corresponding ones of the plurality of DC voltage source strings. The embodiments of the methods also include selectively controlling by the controller a current flowing in each of the plurality of DC voltage source strings by controlling operation of at least one reverse blocking switch associated with a corresponding at least one voltage balancing and extracted output power optimizer circuit, each reverse blocking switch associated with a corresponding one of the plurality of DC voltage source strings. Further, embodiments of the methods include selectively adjusting by the controller a voltage across at least one capacitor associated with a corresponding at least one voltage balancing and extracted output power optimizer circuit, the at least one capacitor being associated with a corresponding one or more of the plurality of DC voltage source strings to selectively adjust a voltage associated with a corresponding one or more of the plurality of DC voltage source strings, wherein the controller selectively controls at least one of a current flowing in and a voltage associated with corresponding ones of the plurality of DC voltage source strings to operate each DC voltage source string at approximately a corresponding maximum power point (MPP).

These and other features of the present invention will become readily apparent upon further review of the following specification and drawings.

BRIEF DESCRIPTION OF DRAWINGS

Unless otherwise indicated, similar reference characters denote corresponding features consistently throughout the attached drawings.

BEST MODES FOR CARRYING OUT THE INVENTION

Figure 1A:
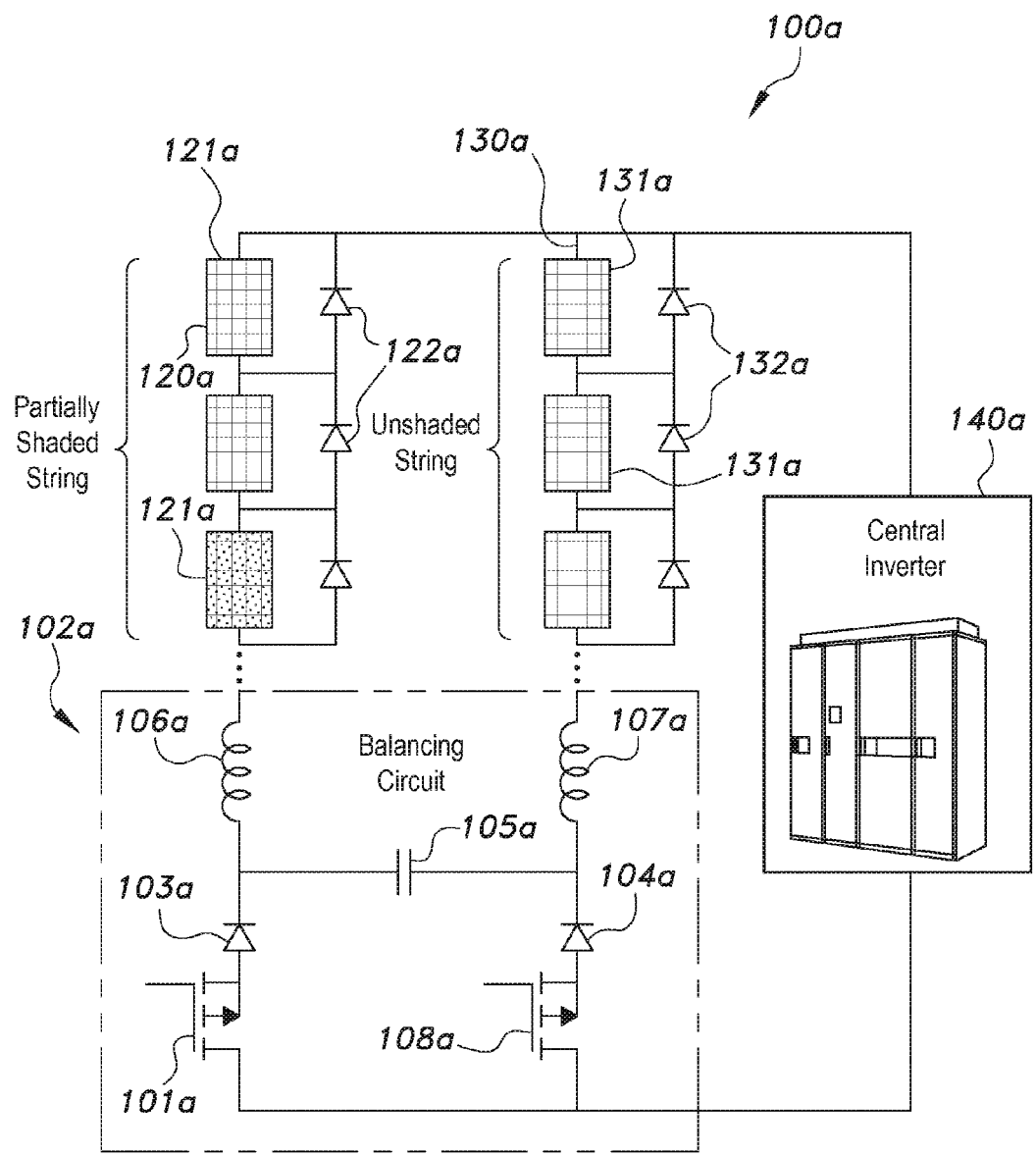
FIG. 1A illustrates a schematic diagram illustrating an embodiment of a power generation system including a power system optimizer circuit including voltage balancing and extracted output power optimizer circuit for a pair of DC voltage source strings to voltage balance or control current flowing in a corresponding DC voltage source string according to the present invention.

Referring now to FIG. 1A, for example, embodiments of voltage balancing and extracted output power topologies are described to address the decreased power utilization due to parallel operation of strings of DC voltage sources, such as PV arrays, such as in the case of partial shading of one or more DC voltage source strings, by enabling independent operating voltages of the DC voltage source strings, as can also provide topologies to optimize extracted output power in a power generation system. Therefore, in embodiments of apparatuses and methods for a voltage balancing topology coupled with renewable energy sources using maximum power point tracking and control of power generation, each DC voltage source string can deliver a maximum power irrespective of the voltage of other DC voltage source strings.

Figure 3A:
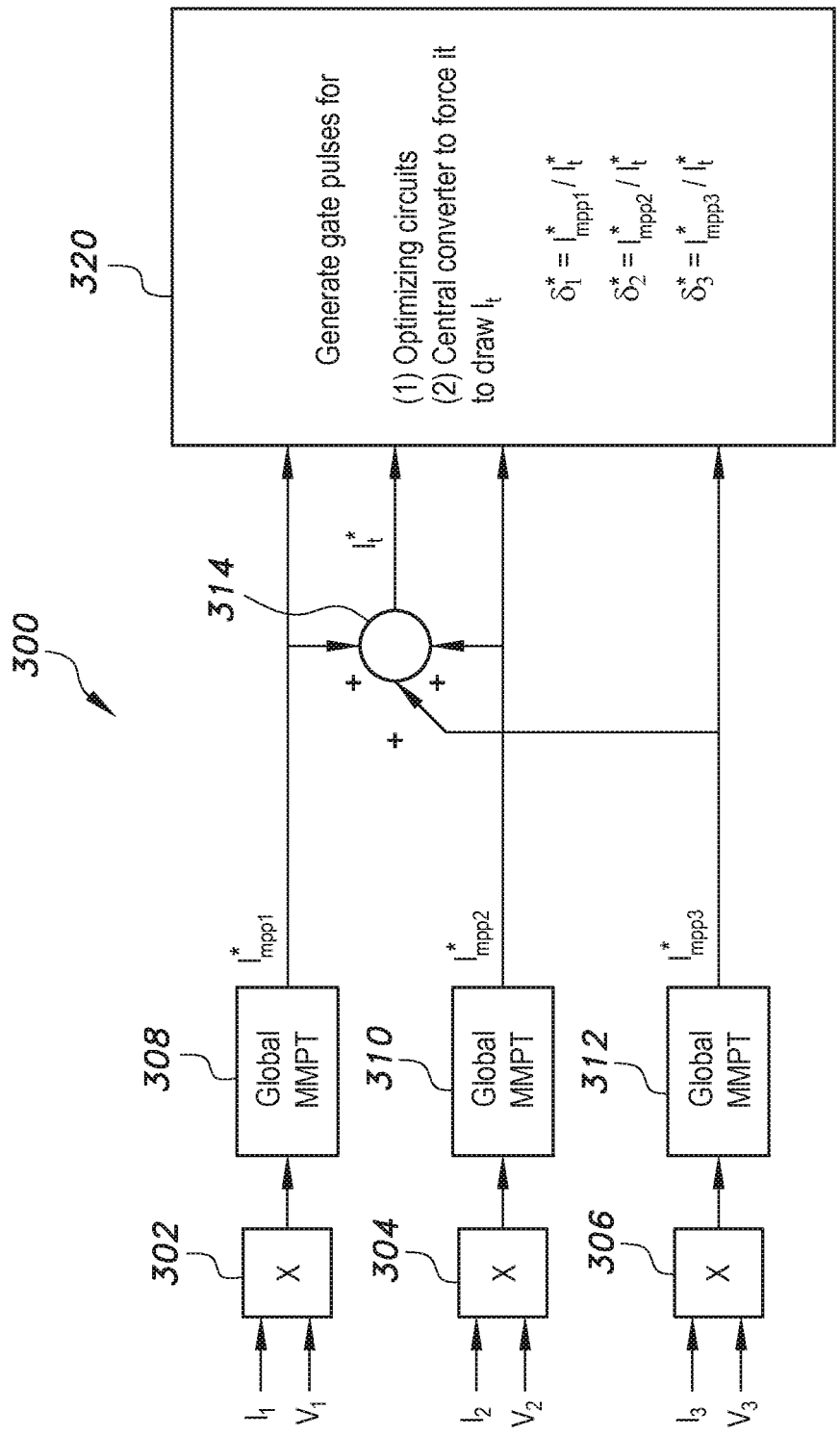
FIG. 3A illustrates a schematic block diagram of an embodiment of a MPPT power system controller and process to adjust or balance a voltage or to control a current flowing in corresponding DC voltage source strings, such as to optimize extracted output power from corresponding DC voltage source strings, in embodiments of power generation systems according to the present invention.
Figure 3B:
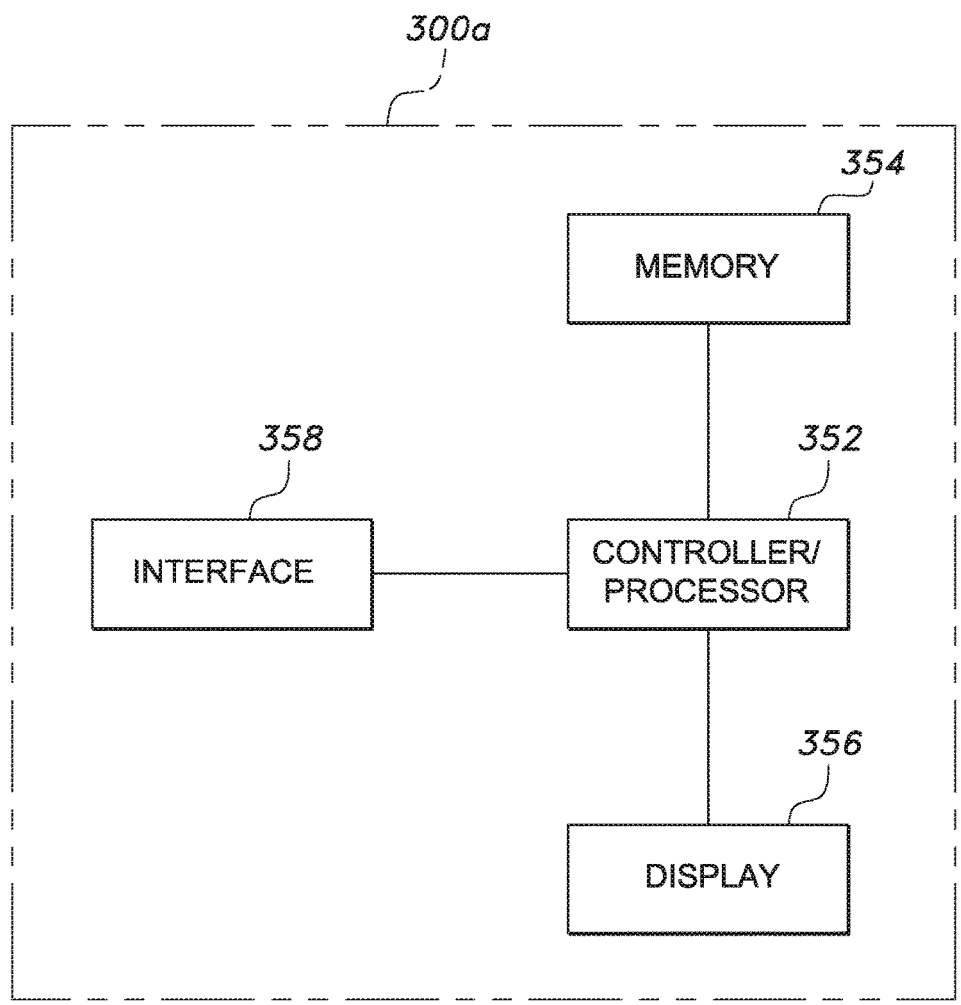
FIG. 3B is a block diagram of a generalized system, including a controller/processor, a memory and an interface, as can be used for implementing apparatuses and methods of embodiments of a MPPT power system controller and process to adjust or balance a voltage or to control a current flowing in corresponding DC voltage source strings, such as to voltage balance or to optimize extracted output power from corresponding DC voltage source strings, in embodiments of power generation systems according to the present invention.

For example, FIG. 1A illustrates a power generation system 100a that includes a power system optimizer circuit including voltage balancing and extracted output power optimizer circuit topology, such as a power system optimizer circuit 102a including a voltage balancing and extracted output power optimizer circuit, that can be utilized to balance and adjust the voltages of and to control current flow in the DC voltage source strings 120a and 130a, as well as can be used in conjunction with a MPPT power system controller 300 or a generalized system 300a, as in FIGS. 3A and 3B, in voltage balancing and to optimize extracted output power from a corresponding DC voltage source string 120a or 130a, for example.

The DC voltage source string 120a includes a plurality of DC voltage sources, such as PV panels 121a, as renewable energy sources, and a plurality of bypass diodes 122a respectively associated with a PV panel 121a to selectively short the current that would pass through the corresponding PV panel 121a, as can depend on current flow in the corresponding DC voltage source string. Similarly, the DC voltage source string 130a includes a plurality of DC voltage sources, such as PV panels 131a, as renewable energy sources, and a plurality of bypass diodes 132a respectively associated with the PV panels 131a to selectively short the current that would pass through the corresponding PV panel 131a, as can depend on current flow in the corresponding DC voltage source string. A central inverter 140a converts the generated DC voltage to an AC voltage to be supplied from the power generation system 100a.

The power system optimizer circuit 102a includes switches 101a and 108a, as reverse blocking switches, such as a MOSFET, in series with a corresponding diode 103a and a corresponding diode 104a to control a direction of current flow and a relatively small filter, such as can be provided at least in part by inductors 106a and 107a per DC voltage source string. The voltage difference between the DC voltage source strings 120a and 130a is provided or constructed across a capacitor 105a, as can also provide filtering in the power system optimizer circuit 102a. The current flowing in each DC voltage source string 120a and 130a is controlled by the duty ratio of the corresponding switch 101a and 108a, such as a reverse blocking switch for voltage balancing in the power generation system 100a.

Figure 1B:
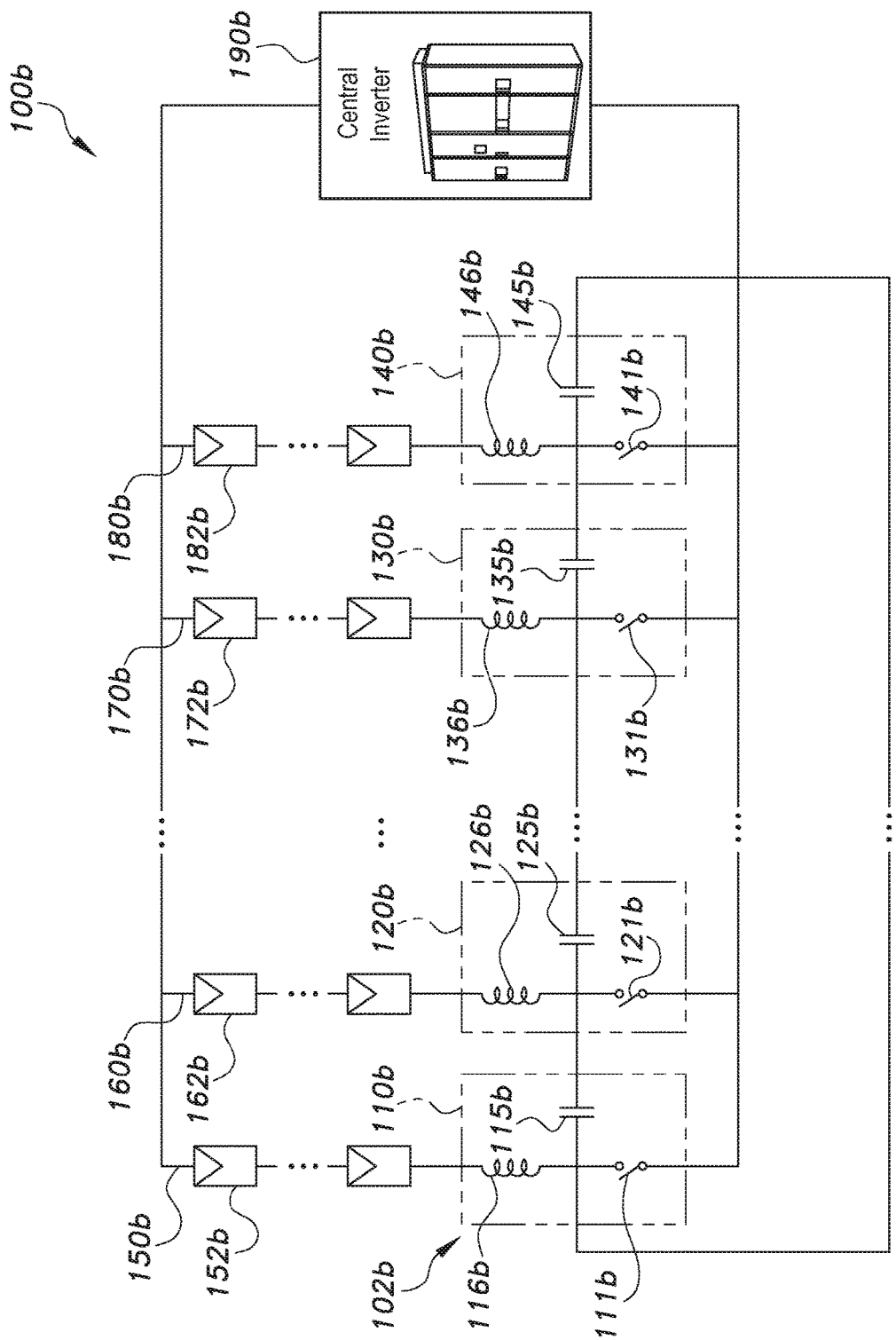
FIG. 1B illustrates a general schematic diagram illustrating an embodiment of a power generation system including an embodiment of a power system optimizer circuit including a plurality of a voltage balancing and extracted output power optimizer circuits arranged in a cascade type relation to voltage balance or control current flowing in a corresponding DC voltage source string each having a single switch to control current in the corresponding DC voltage source string according to the present invention.

FIG. 1B illustrates a schematic diagram illustrating an embodiment of a power generation system 100b including a power system optimizer circuit 102b including a plurality of voltage balancing and extracted output power optimizer circuits 110b, 120b, 130b and 140b for voltage balancing a plurality of n strings of DC voltage sources, such as where n=4, as well as can be used to optimize extracted output power from one or more of corresponding DC voltage source strings. The power generation system 100b also includes and specifically illustrates DC voltage source strings 150b, 160b, 170b and 180b.

As illustrated in FIG. 1B, each voltage balancing and extracted output power optimizer circuit 110b, 120b, 130b and 140b is respectively arranged in a cascaded type relation in the power generation system 100b, as well as can be used in conjunction with the MPPT power system controller 300 or the generalized system 300a, as in FIGS. 3A and 3B, in voltage balancing and to optimize extracted output power from corresponding DC voltage source strings, for example, for power generation in a power generation system, such as power generation system 100b.

The power system optimizer circuit 102b topology has been modified from that shown in voltage balancing and extracted output power optimizer circuit of the power system optimizer circuit 102a topology of FIG. 1A, for example, in that the number of switches in each voltage balancing and extracted output power optimizer circuit 110b, 120b, 130b and 140b has been reduced, such as by using a single switch in each of the corresponding voltage balancing and extracted output power optimizer circuits 110b, 120b, 130b and 140b.

However, use of such reduced number of switches, as can be reverse blocking switches, typically will have a higher rating, for example. By use of such reduced number of switches, the power system optimizer circuit 102b topology can enhance reliability for voltage balancing and extracted output power optimization in that the number of components in the voltage balancing and extracted output power optimizer circuits in the power system optimizer circuit 102b topology can be reduced, as well as can provide a reduced cost for the voltage balancing circuits, for example.

Also, the operation of the power system optimizer circuit 102b topology is similar to that described in relation to the operation of one or more of the voltage balancing and extracted output power optimizer circuit of the power system optimizer circuit 102a in the power system optimizer circuit topology of FIG. 1A in that the current into the PV panels in the corresponding DC voltage source string is controlled to a value which can provides maximum power out of the corresponding DC voltage source string.

The functionality of the power system optimizer circuit 102b topology of FIG. 1B likewise provides for power optimizing as current into a DC voltage source string, such as including one or more PV panels, is controlled to a value which can enhance providing a maximum power out of the corresponding DC voltage source string, by control of the current for the corresponding DC voltage source string by a corresponding single switch. Therefore, the power system optimizer circuit topology 102b is somewhat different from that of the power system optimizer circuit topology of FIG. 1A, where the current in the corresponding DC voltage source string is controlled by at least two switches, but in the power system optimizer circuit 102b topology a single switch is used to control the current in the corresponding DC voltage source string, for example.

As illustrated in FIG. 1B, for example, the voltage balancing and extracted output power optimizer circuit 110b is associated with the DC voltage source string 150b, the voltage balancing and extracted output power optimizer circuit 120b is associated with the DC voltage source string 160b, the voltage balancing and extracted output power optimizer circuit 130b is associated with the DC voltage source string 170b, and the voltage balancing and extracted output power optimizer circuit 140b is associated with the DC voltage source string 180b.

The DC voltage source strings 150b, 160b, 170b and 180b respectively include a plurality of DC voltage sources, such as PV panels 152b, 162b, 172b and 182b, as renewable energy sources, as well as can include a plurality of bypass diodes respectively associated with a corresponding PV panel to selectively short the current that would pass through the corresponding PV panel, as can depend on current flow in the corresponding DC voltage source string. A central inverter 190b converts the generated DC voltage to an AC voltage to be supplied from the power generation system 100b.

The voltage balancing and extracted output power optimizer circuit 110d includes a switch 111d, as can be reverse blocking switch, such as a MOSFET, as can be in series with a corresponding diode to control a direction of current flow and a relatively small filter, such as can be provided at least in part by an inductor 116d per DC voltage source string. While the single switch 111d controls the current in the PV panels in the DC voltage source string 150d, the voltage difference between the DC voltage source strings 150d and 160d is provided or constructed across a capacitor 115d, as can also provide filtering in the voltage balancing and extracted output power optimizer circuit 110d. The current flowing in the DC voltage source string 150d is controlled by or at least in part by the duty ratio of the corresponding switch 111d, such as can be a reverse blocking switch, to voltage balance or control current flowing in the DC voltage source string 150d in the power generation system 100d.

The voltage balancing and extracted output power optimizer circuit 120b includes a switch 121b, as can be reverse blocking switch, such as a MOSFET, as can be in series with a corresponding diode to control a direction of current flow and a relatively small filter, such as can be provided at least in part by an inductor 126b per DC voltage source string. While the single switch 121b controls the current in the PV panels in the DC voltage source string 160b, the voltage difference between the DC voltage source strings 160b and 170b is provided or constructed across a capacitor 125b, as can also provide filtering in the voltage balancing and extracted output power optimizer circuit 120b. The current flowing in the DC voltage source string 160b is controlled by or at least in part by the duty ratio of the corresponding switch 121b, such as can be a reverse blocking switch, to voltage balance or control current flowing in the DC voltage source string 160b in the power generation system 100b.

The voltage balancing and extracted output power optimizer circuit 130b includes a switch 131b, as can be reverse blocking switch, such as a MOSFET, as can be in series with a corresponding diode to control a direction of current flow and a relatively small filter, such as can be provided at least in part by an inductor 136b per DC voltage source string. While the single switch 131b controls the current in the PV panels in the DC voltage source string 170b, the voltage difference between the DC voltage source strings 170b and 180b is provided or constructed across a capacitor 135b, as can also provide filtering in the voltage balancing circuit 130b. The current flowing in the DC voltage source string 170b is controlled by or at least in part by the duty ratio of the corresponding switch 131b, such as can be a reverse blocking switch, to voltage balance or control current flowing in the DC voltage source string 170b in the power generation system 100b.

The voltage balancing and extracted output power optimizer circuit 140b includes a switch 141b, as can be reverse blocking switch, such as a MOSFET, as can be in series with a corresponding diode to control a direction of current flow and a relatively small filter, such as can be provided at least in part by an inductor 146b per DC voltage source string. While the single switch 141b controls the current in the PV panels in the DC voltage source string 180b, the voltage difference between the DC voltage source strings 180b and 150b is provided or constructed across a capacitor 145b, as can also provide filtering in the voltage balancing circuit 140b. The current flowing in the DC voltage source string 180b is controlled by or at least in part by the duty ratio of the corresponding switch 141b, such as can be a reverse blocking switch, to voltage balance or control current flowing in the DC voltage source string 180b in the power generation system 100b.

Referring, for example, to the voltage balancing and extracted output power optimizer circuit of the power system optimizer circuit 102a topology of the power generation system 100a presented in FIG. 1A, each leg in the power system optimizer circuit 102a respectively includes (a) the reverse blocking switch 101a, 108a to control the average string current I of the DC voltage source strings 120a and 130a, (b) the capacitor 105a to filter out the high frequency current due to switching on and off of the reverse blocking switches 101a and 108a and (c) an inductor 106a, 107a to minimize or reducing the ripple current corresponding to the switching of the reverse blocking switch 101a, 108a flowing in the corresponding DC voltage source strings 120a, 130a, with the voltage difference between the DC voltage source strings 120a and 130a being constructed across the filter capacitor 105a for voltage balancing.

To provide the current continuity of the inductor currents and capacitor voltage of the power system optimizer circuit 102a in FIG. 1A, the two reverse blocking switches 101a and 108a in the power system optimizer circuit, when implemented for voltage balancing, are alternatively turned on, i.e. sum of their duty ratios $(\delta_1+\delta_2)=1$, for example. Current and voltage differential equations for relations governing the operation of embodiments of a voltage balancing process in the power system optimizer circuit 102a, as can be generally applied to embodiments of voltage balancing and extracted output power optimizer circuit topologies, such as of the power system optimizer circuit topology of FIG. 1B, are as follows:

$$[v_{c12}^o] = \frac{1}{C} - [-\delta_2 \ \delta_1] \cdot \begin{bmatrix} i_1 \\ i_2 \end{bmatrix} \text{ and} \quad (1)$$

$$\begin{bmatrix} i_1^o \\ i_2^o \end{bmatrix} = \frac{1}{L} \begin{bmatrix} -r & 0 \\ 0 & -r \end{bmatrix} \cdot \begin{bmatrix} i_1 \\ i_2 \end{bmatrix} + \frac{1}{L} \begin{bmatrix} v_{s1} - v_0 \\ v_{s2} - v_0 \end{bmatrix} + \frac{1}{L} \begin{bmatrix} \delta_2 \\ -\delta_1 \end{bmatrix} [v_{c12}]. \quad (2)$$

C is a capacitor having a filter capacitance, L in an inductor having a filter inductance, r is the equivalent series resistance, $V_{s1}$ and $V_{s2}$ are the string voltages in first and second DC voltage source strings 120a and 130a, the output voltage is $V_o$, $v_{c12}^o$ is a reference voltage difference across the capacitor C corresponding to the capacitor 105a, $v_{c12}$ is a state variable corresponding to the voltage difference across the capacitor C, $i_1^o$ and $i_2^o$ are reference currents in first and second DC voltage source strings 120a and 130a, $i_1$ and $i_2$ are state variables corresponding to string currents in first and second DC voltage source strings 120a and 130a, and the reverse blocking switches 101a and 108b duty ratios are $\delta_1$ and $\delta_2$, for example. From relation (1), each string current is proportional to its corresponding duty ratio at the steady state according to the following relation:

$$\frac{i_1}{i_2} = \frac{\delta_1}{\delta_2} \text{ i.e. } \begin{bmatrix} i_1 \\ i_2 \end{bmatrix} = \begin{bmatrix} \delta_1 \\ \delta_2 \end{bmatrix} \cdot [i_1 + i_2]. \quad (3)$$

Figure 1C:
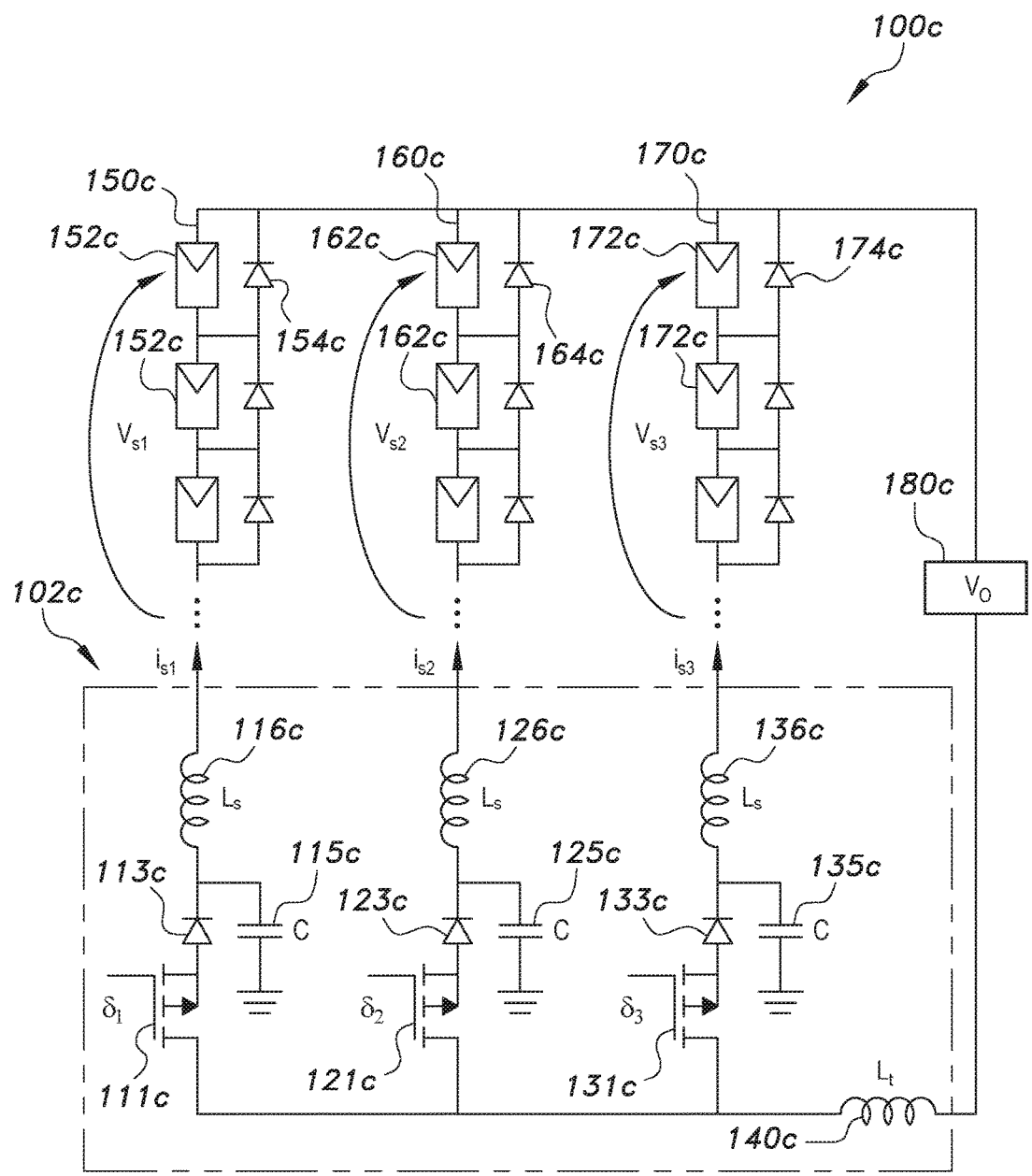
FIG. 1C illustrates a schematic diagram illustrating an embodiment of a power generation system including an embodiment of a power system optimizer circuit including a voltage balancing and extracted output power optimizer circuit associated with a group of at least three DC voltage source strings to voltage balance or control current flowing in a corresponding DC voltage source string in a corresponding group of DC voltage source strings according to the present invention.

Referring now to FIG. 1C, FIG. 1C illustrates a schematic diagram illustrating an embodiment of a power generation system 100c including an embodiment of a power system optimizer circuit including a voltage balancing and extracted output power optimizer circuit 102c associated with a group of at least three DC voltage source strings to voltage balance or control current flowing in a corresponding DC voltage source string in a corresponding group of DC voltage source strings. The voltage balancing and extracted output power optimizer circuit 102c includes a first DC voltage source string 150c, a second DC voltage source string 160c and a third DC voltage source string 170c, as can be PV arrays, for example.

The power generation system 100c that includes the voltage balancing and extracted output power optimizer circuit 102c topology, such as implemented for voltage balancing, that can be utilized to voltage balance or control current flowing in the corresponding DC voltage source strings 150c, 160c and 170c, can be used in conjunction with the MPPT power system controller 300 or the generalized system 300a, as in FIGS. 3A and 3B, in voltage balancing and to optimize extracted output power from the corresponding DC voltage source string 150c, 160c or 170c, for example.

The DC voltage source string 150c includes a plurality of DC voltage sources, such as PV panels 152c, as renewable energy sources, and a plurality of bypass diodes 154c respectively associated with a PV panel 152c to selectively short the current that would pass through the corresponding PV panel 152c, as can depend on current flow in the corresponding DC voltage source string. Similarly, the DC voltage source string 160c includes a plurality of DC voltage sources, such as PV panels 162c, as renewable energy sources. A plurality of bypass diodes 164c respectively associated with the PV panels 162c to selectively short the current that would pass through the corresponding PV panel 162c, as can depend on current flow in the corresponding DC voltage source string.

Also, the DC voltage source string 170c includes a plurality of DC voltage sources, such as PV panels 172c, as renewable energy sources. A plurality of bypass diodes 174c respectively associated with the PV panels 172c to selectively short the current that would pass through the corresponding PV panel 172c, as can depend on current flow in the corresponding DC voltage source string. A voltage 180c ($V_o$) is provided by the DC voltage source strings 150c, 160c and 170c, such as to a central inverter, similar to central inverters 140a or 190b, that converts the generated DC voltage to an AC voltage to be supplied from the power generation system 100c. Also, a total inductance 140c ($L_t$) for the power generation system 100c is seen by the total current in the power generation system 100c.

The voltage balancing and extracted output power optimizer circuit 102c includes three voltage blocking switches 111c, 121c and 131c, as reverse blocking switches, such as MOSFETs, in series with corresponding diodes 113c, 123c and 133c to control a direction of current flow and a relatively small filter, such as can be provided at least in part by corresponding inductors 116c ($L_s$), 126c ($L_s$) and 136c ($L_s$) per DC voltage source string 150c, 160c and 170c, respectively, for example. When the voltage balancing and extracted output power optimizer circuit 102c is implemented for voltage balancing, a voltage difference to balance the voltages of the first, second and third DC voltage source strings 150c, 160c and 170c is provided or constructed across the capacitors 115c, 125c and 135c, respectively, as can also provide some filtering in the voltage balancing and extracted output power optimizer circuit 102c. The current flowing in the first, second and third DC voltage source strings 150c, 160c and 170c is controlled by the duty ratio $\delta_1$, $\delta_2$, and $\delta_3$ of the corresponding switch 111c, 121c and 131c, such as a reverse blocking switch, for voltage balancing in the power generation system 100c.

In the power generation system 100c of FIG. 1C, the corresponding voltages induced across the inductors 116c ($L_s$), 126c ($L_s$) and 136c ($L_s$) and the total inductance 140c ($L_t$) in the three string voltage balancing and extracted output power optimizer circuit 102c in relation to voltage balancing to achieve the MPP for the corresponding first, second and third DC voltage source strings 150c, 160c and 170c can be expressed by the following relations:

$$L_s i_1^o + L_t(i_1^o + i_2^o + i_3^o) = v_{s1} - i_1 r_1 - v_o + \delta_1 * 0 + \delta_2 (v_{c1} - v_{c2}) + \delta_3 (v_{c1} - v_{c3}), \quad (4A)$$

$$L_s i_2^o + L_t(i_1^o + i_2^o + i_3^o) = v_{s2} - i_2 r_2 - v_o + \delta_2 * 0 + \delta_1 (v_{c2} - v_{c1}) + \delta_3 (v_{c2} - v_{c3}), \quad (4B)$$

$$L_s i_3^o + L_t(i_1^o + i_2^o + i_3^o) = v_{s3} - i_3 r_3 - v_o + \delta_3 * 0 + \delta_2 (v_{c3} - v_{c2}) + \delta_1 (v_{c3} - v_{c1}), \quad (4C)$$

where $L_t$ is the total inductance of the voltage balancing and extracted output power optimizer circuit 102c, $L_s i_1^o$ is the voltage induced in the inductor 116c ($L_s$) associated with the first DC voltage source string 150c by a first string reference current $i_1^o$($i_{s1}$), $L_s i_2^o$ is the voltage induced in the inductor 126c ($L_s$) associated with the second DC voltage source string 160c by a second string reference current $i_2^o$ ($i_{s2}$), $L_s i_3^o$ is the voltage induced in the inductor 136c ($L_s$) associated with the third DC voltage source string 170c by the third string reference current $i_3^o$ ($i_{s3}$), $v_{s1}$, $v_{s2}$, and $v_{s3}$ are state variables corresponding to string voltages in the first, second and third DC voltage source strings 150c, 160c and 170c, $v_{c1}$, $v_{c2}$, and $v_{c3}$ are state variables corresponding to capacitor voltages of capacitors 115c (C), 125c (C) and 135c (C) associated with the corresponding first, second and third DC voltage source strings 150c, 160c and 170c, $v_o$ is a state variable corresponding to the output voltage of the power generation circuit 100c, $r_1$, $r_2$ and $r_3$ are state variables corresponding to resistances of the first, second and third DC voltage strings 150c, 160c and 170c, $i_1$, $i_2$ and $i_3$ are state variables corresponding to string currents of the first, second and third DC voltage strings 150c, 160c and 170c and $\delta_1$, $\delta_2$, and $\delta_3$ are corresponding duty ratios of the reverse blocking switches 111c, 121c and 131c associated with the corresponding first, second and third DC voltage strings 150c, 160c and 170c, for example.

Placing the above relations (4A), (4B) and (4C) in a state space matrix form provides the following relation:

$$\begin{bmatrix} L_s + L_t & L_t & L_t \\ L_t & L_s + L_t & L_t \\ L_t & L_t & L_s + L_t \end{bmatrix} \cdot \begin{bmatrix} i_1^o \\ i_2^o \\ i_3^o \end{bmatrix} = \begin{bmatrix} -r_1 & 0 & 0 \\ 0 & -r_2 & 0 \\ 0 & 0 & -r_3 \end{bmatrix} \cdot \begin{bmatrix} i_1 \\ i_2 \\ i_3 \end{bmatrix} + \qquad (5)$$

$$\begin{bmatrix} v_{s1} - v_0 \\ v_{s2} - v_0 \\ v_{s3} - v_0 \end{bmatrix} + \begin{bmatrix} (\delta_2 + \delta_3) & -\delta_2 & -\delta_3 \\ -\delta_1 & (\delta_1 + \delta_3) & -\delta_3 \\ -\delta_1 & -\delta_2 & (\delta_1 + \delta_2) \end{bmatrix} \begin{bmatrix} v_{c1} \\ v_{c2} \\ v_{c3} \end{bmatrix}.$$

Further, a relation of reference voltages $v_{c1}^o$, $v_{c2}^o$ and $v_{c3}^o$ of the capacitors 115c (C), 125c (C) and 135c (C) in the first, second and third DC voltage source strings 150c, 160c and 170c of the voltage balancing and extracted output power optimizer circuit 102c to the state variables $v_{c1}$, $v_{c2}$, and $v_{c3}$ corresponding to the capacitance voltages of the capacitors 115c (C), 125c (C) and 135c (C) in the three line voltage balancing and extracted output power optimizer circuit 102c corresponding to the first, second and third DC voltage source strings 150c, 160c and 170c, the capacitance of the capacitors 115c (C), 125c (C) and 135c (C), the duty ratios $\delta_1$, $\delta_2$, and $\delta_3$ of the reverse blocking switches 111c, 121c and 131c, and the state variables $i_1$, $i_2$ and $i_3$ corresponding to the string currents of the first, second and third DC voltage source strings 150c, 160c and 170c can be expressed in a matrix form relation as follows:

$$\begin{bmatrix} v_{c1}^o \\ v_{c2}^o \\ v_{c3}^o \end{bmatrix} = \frac{1}{c} \begin{bmatrix} \delta_1 - 1 & \delta_1 & \delta_1 \\ \delta_2 & \delta_2 - 1 & \delta_2 \\ \delta_3 & \delta_3 & \delta_3 - 1 \end{bmatrix} \cdot \begin{bmatrix} i_1 \\ i_2 \\ i_3 \end{bmatrix}. \qquad (6)$$

Embodiments of voltage balancing and extracted output power optimizer circuits, similar to the topologies of FIG. 1A, implemented for voltage balancing of DC voltage source strings using maximum power point tracking and control of power generation as implemented by embodiments of corresponding MPPT algorithm operations and processes, as described herein, have been verified experimentally. In the experimental verification, PV modules were connected to form an array of three DC voltage source strings, and each DC voltage source string included two series connected PV modules. Each PV module received from the manufacturer had two bypass diodes across its two series halves. The positive terminals of the three DC voltage source strings were solid connected to each other to form the positive DC rail, while the three negative terminals of the DC voltage source strings were connected to a set of three voltage balancing circuits to form the negative DC rail. The DC link was feeding a buck converter that was feeding a resistive load. The buck converter in the experimental verification was imitating a stand-alone MPPT control operation of a central inverter but without focusing on grid interfacing issues, for example.

In the experimental verification, to consider the effects of partial shading on extracted output power, as well as to verify various advantages of embodiments of voltage balancing and extracted output power optimizer circuit topologies implemented as voltage balancing circuit topologies, half of a PV panel in DC voltage source string no. 2 was shaded and, as such, it was bypassed by its parallel diodes. Therefore, DC voltage source string no. 2 had a lower voltage of a $V_{open\ circuit} \approx 30V$ than the other two DC voltage source strings nos. 1 and 3 of a $V_{open\ circuit} \approx 40V$, for example.

Figure 4A:
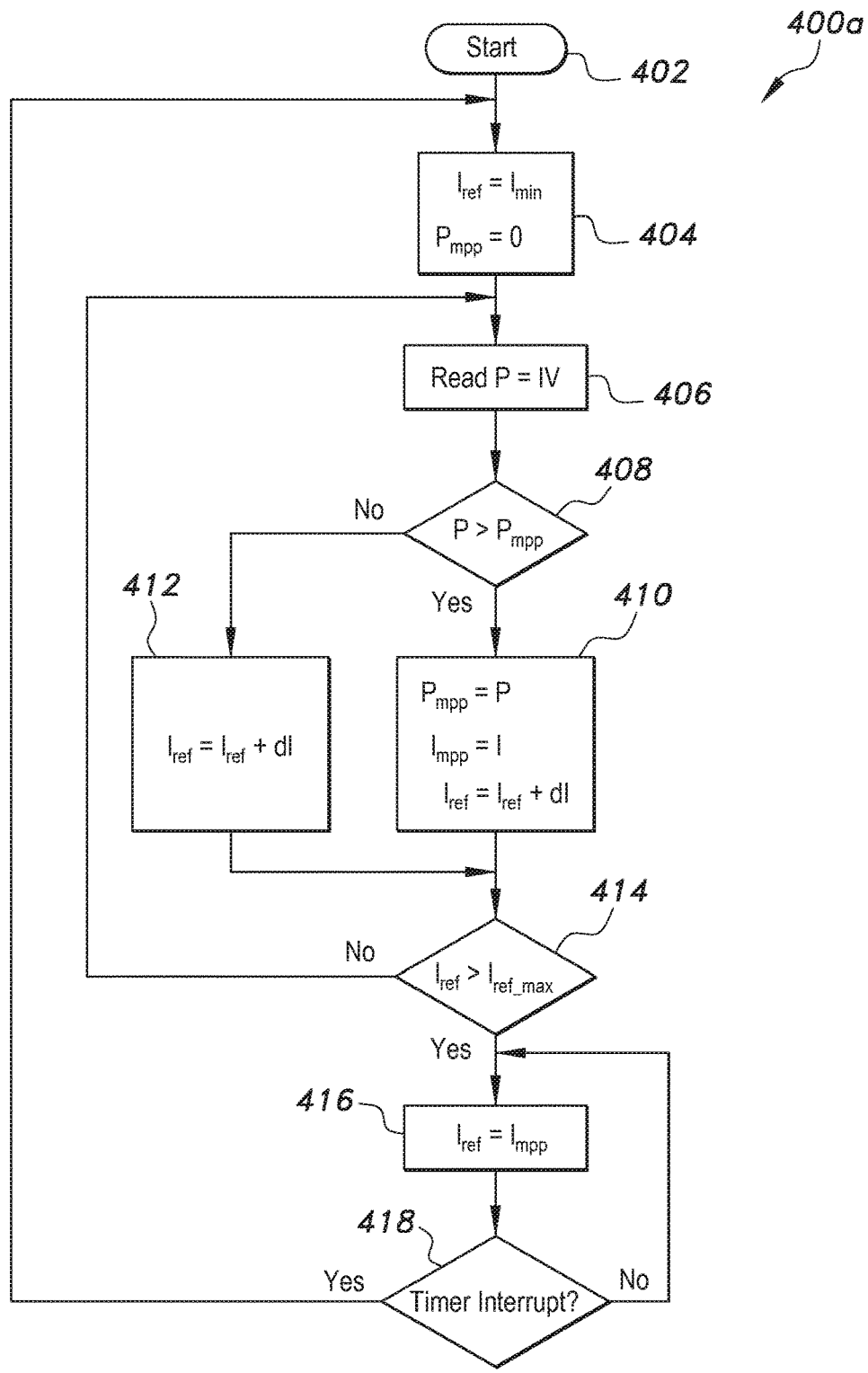
FIG. 4A illustrates a flow chart of an embodiment of a process to control current flow to optimize extracted output power from corresponding DC voltage source strings in embodiments of power generation systems according to the present invention.
Figure 4B:
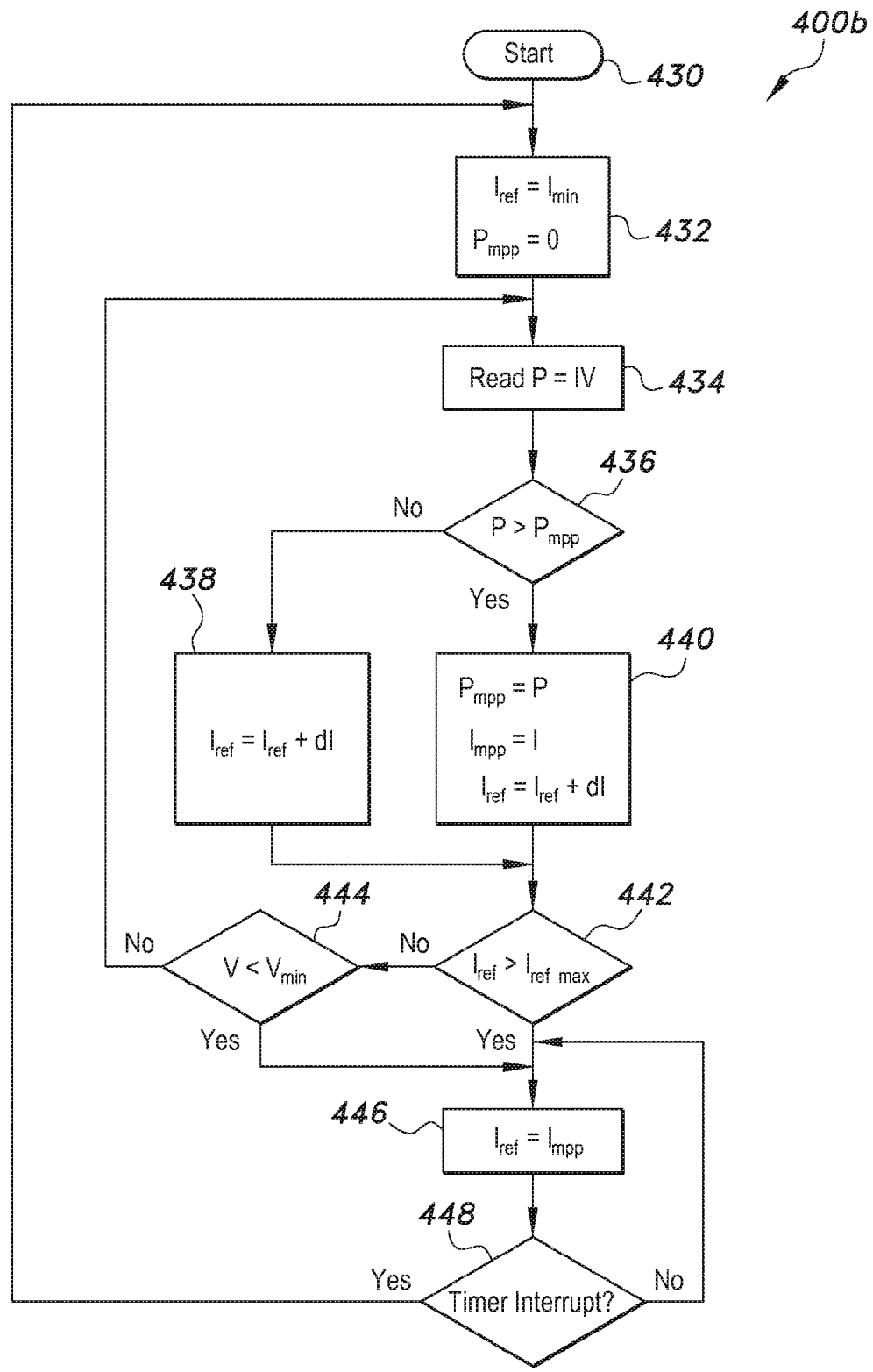
FIG. 4B illustrates a flow chart of an embodiment of a process to control current flow to optimize extracted output power from corresponding DC voltage source strings in embodiments of power generation systems according to the present invention.
Figure 4C:
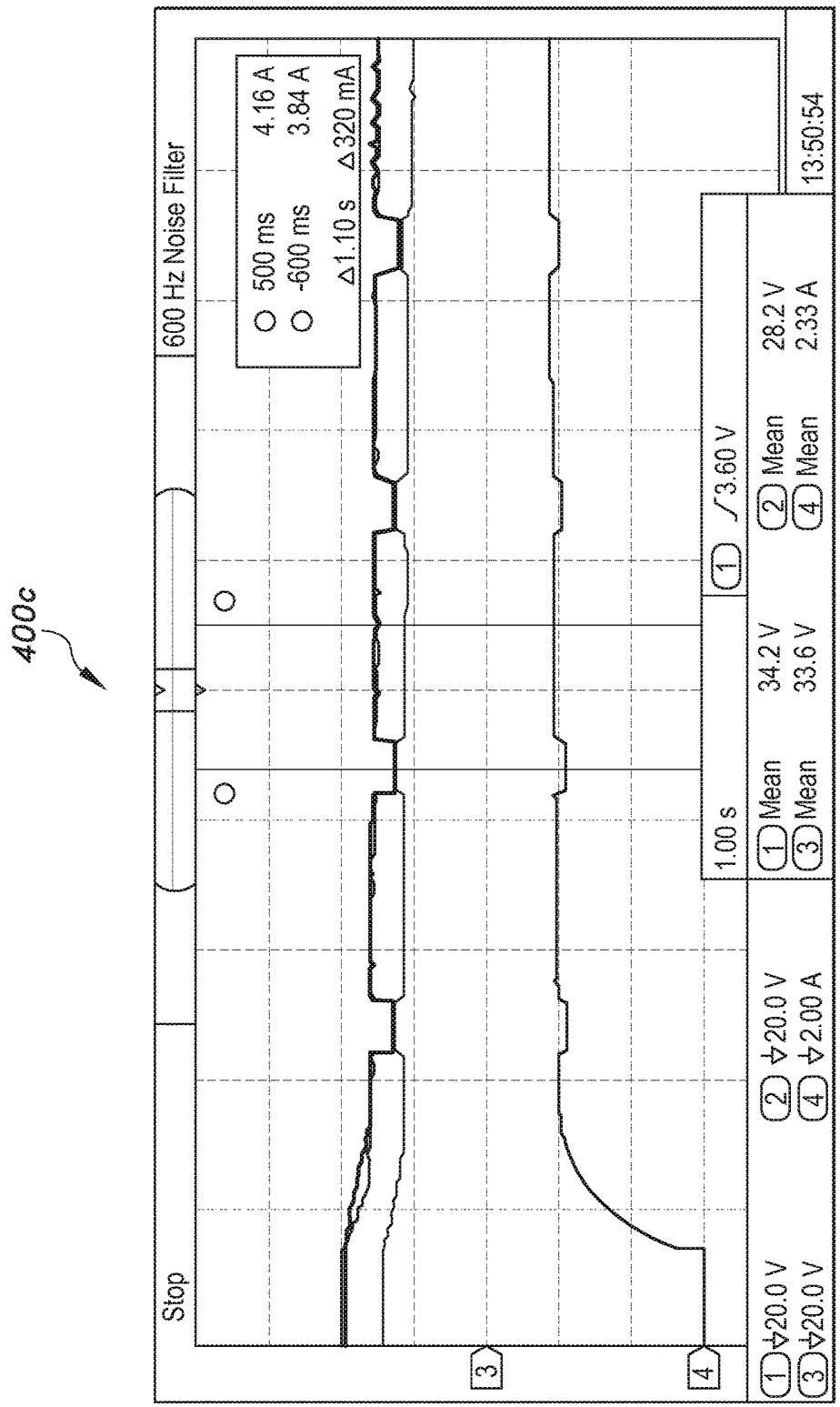
FIG. 4C illustrates diagrammatically experimental results of the effect of the extracted power with and without utilizing embodiments of voltage balancing circuits or topologies in parallel operation of DC voltage source strings in power generation using DC voltage sources.
Figure 5:
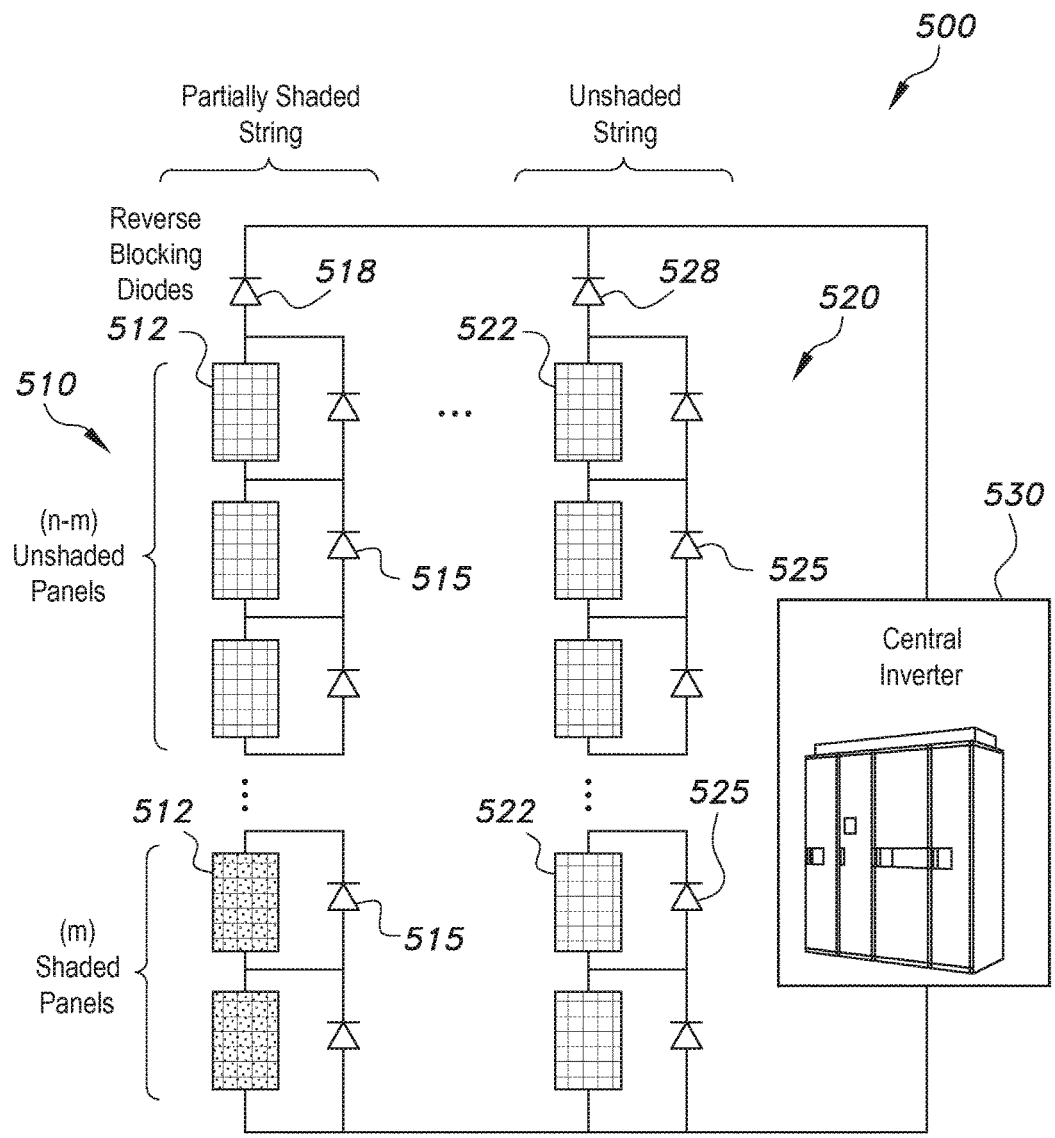
FIG. 5 is a schematic diagram illustrating a power generation system including photovoltaic (PV) arrays of a plurality of DC voltage source strings.
Figure 6A:
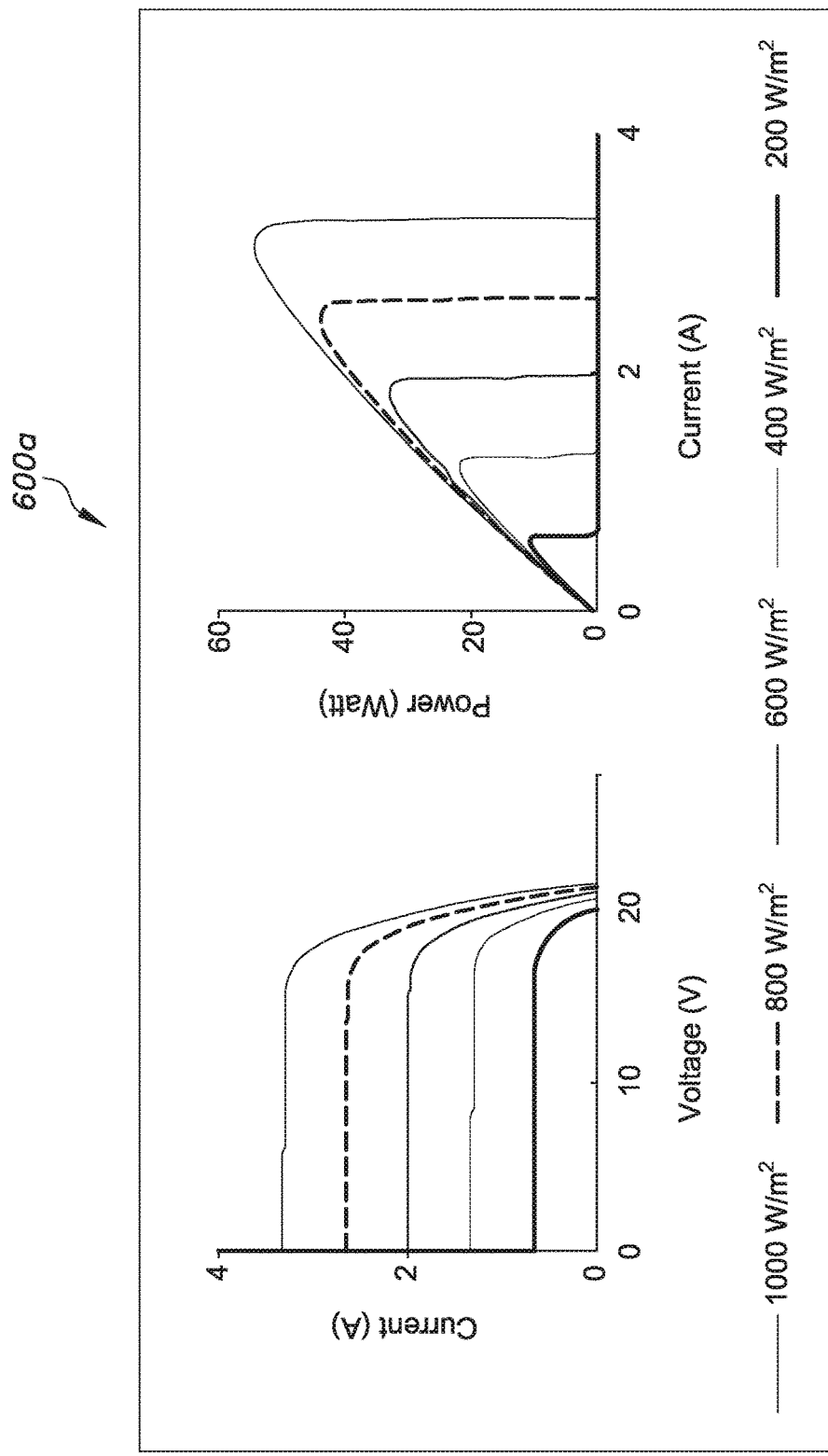
FIG. 6A illustrates and a voltage-current (I-V) curve at different irradiance levels and a power-current curve at different irradiance levels.
Figure 6B:
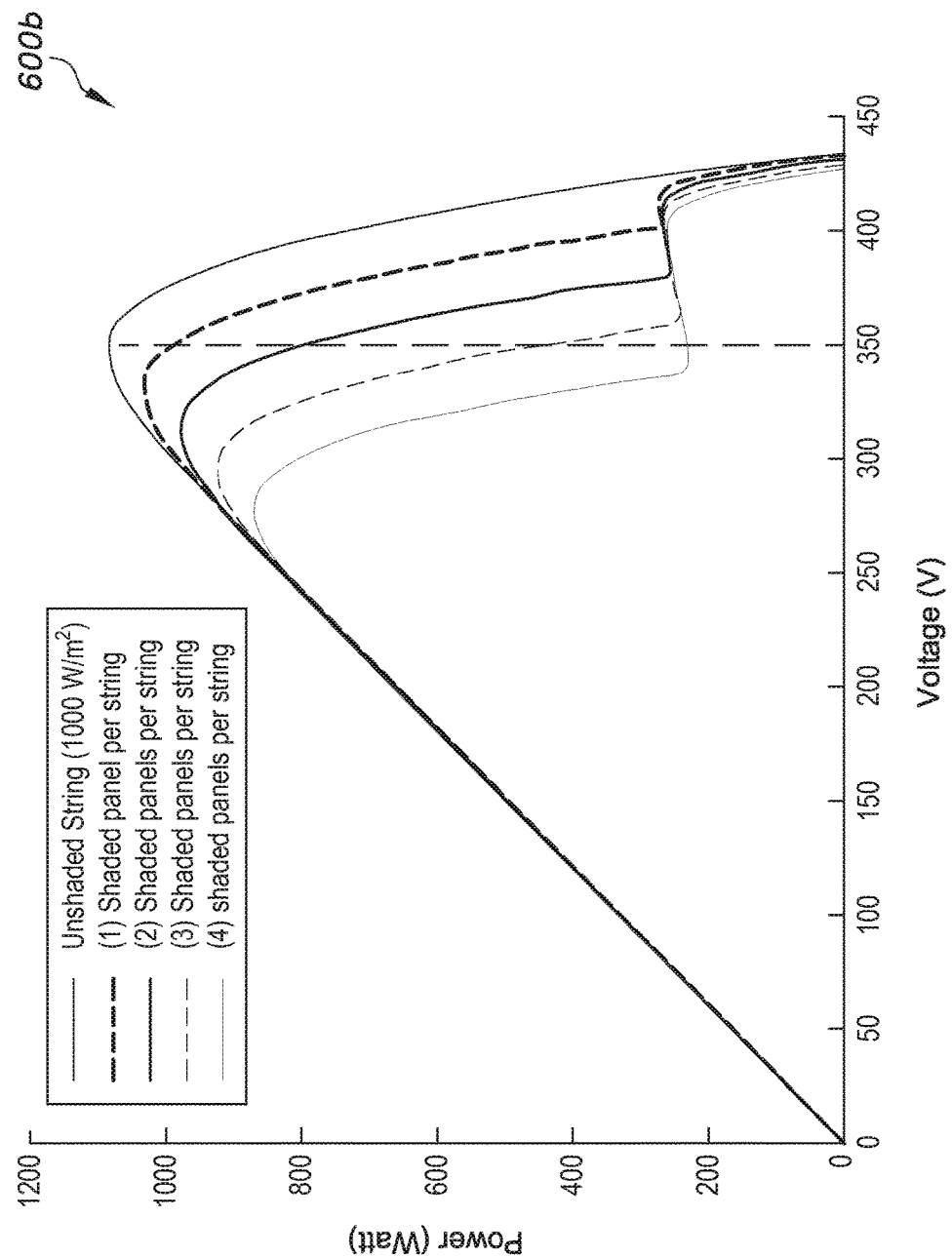
FIG. 6B illustrates a graph of power versus voltage for a string of twenty (20) series panels at different numbers of shaded panels per string.
Figure 6C:
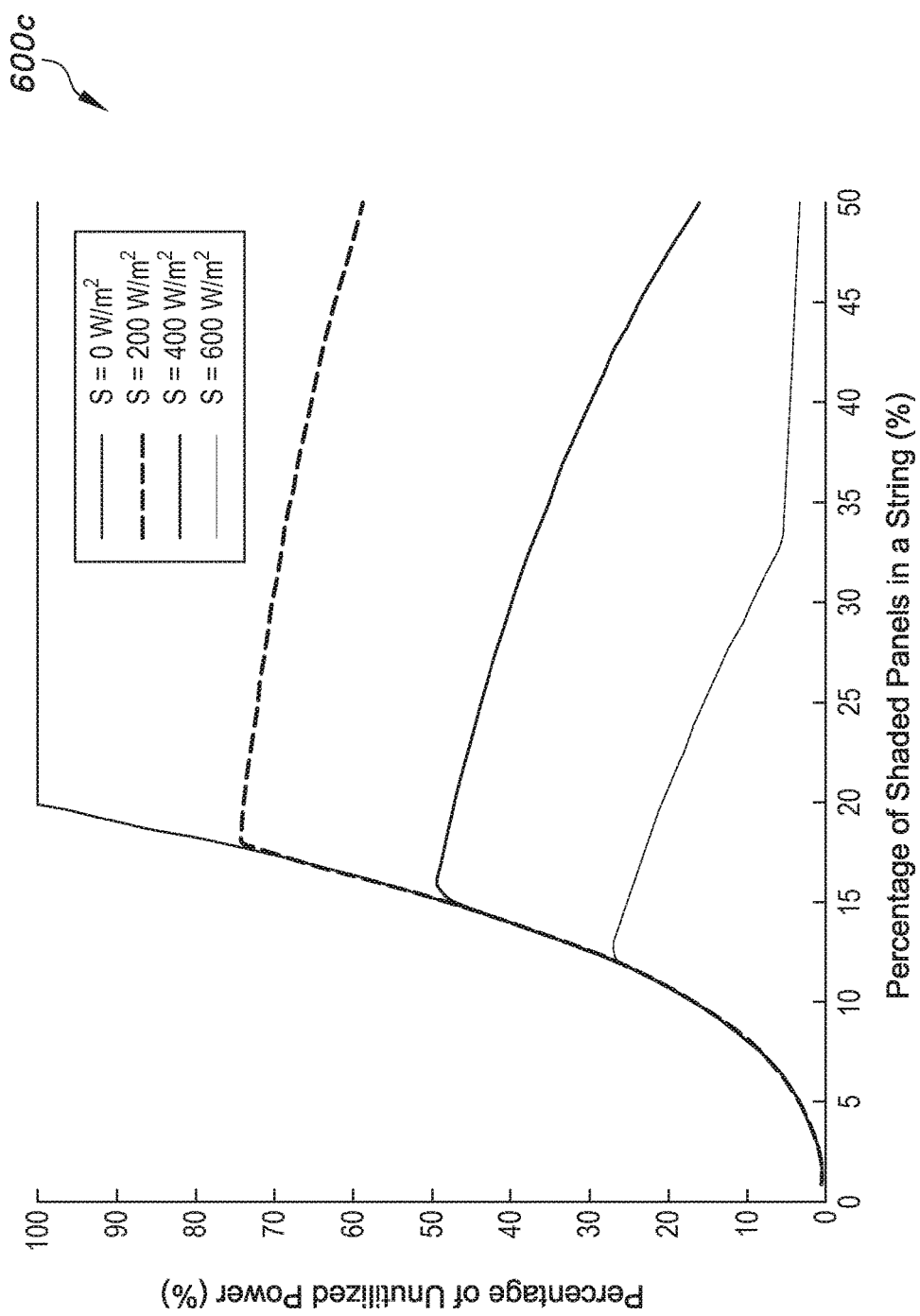
FIG. 6C illustrates a graph of percentage of shaded panels in a string (%) versus percentage of unutilized power (%) in relation to unutilized power in a partially shaded string of FIG. 6B due to parallel connection.

Referring now to FIG. 4C, there are illustrated diagrammatically experimental results of the effect of the extracted power with and without utilizing embodiments of voltage balancing circuits or topologies in parallel operation of DC voltage source strings in power generation using DC voltage sources.

In FIG. 4C in the plot 400c, in the experimental verification as to results under partial shading conditions, channels 1, 2 and 3 represent the voltages of the three strings at 20 Volts/division (V/div) and channel 4 represents the resistive load current at 2 Ampere/division (A/div) at a time scale of 1 second/division, for example.

Referring to FIG. 4C, in the plot 400c there is illustrated a traditional parallel operation of the three DC voltage source strings, such as by turning on all the switches of the balancing circuits at the same or substantially the same time. In the traditional operation illustrated in the plot 400c of FIG. 4C, the diodes were placed in series with the MOSFETs in the circuit and therefore replaced the reverse blocking protection. Since DC voltage source string no. 2 was partially shaded, it had a lower voltage than the DC voltage source strings nos. 1 and 3 which were not shaded in the experimental power generation operation. In FIG. 4C the global MPPT was trapped at the MPP of the non-shaded DC voltage source strings nos. 1 and 3 and the shaded DC voltage source string no. 2 had a lower $V_{Open\ Circuit}$ than the $V_{MPP}$ of the other two DC voltage source strings nos. 1 and 3 and, as a result, DC voltage source string no. 2 was not sharing power for power generation.

Therefore, in traditional parallel operation of the DC voltage source strings illustrated in the plot 400c of FIG. 4C, the global MPPT is trapped at the MPP of the DC voltage source strings nos. 1 and 3, and DC voltage source string no. 2 that was shaded has a lower $V_{open\ circuit}$ than the $V_{MPP}$ of the other DC voltage source strings nos. 1 and 3. Thus, DC voltage source string no. 2 did not substantially contribute or share power, and its voltage did not significantly drop, because its open circuit voltage is less than MPP voltage of the DC voltage source strings nos. 1 and 3, for example.

Continuing also with reference to FIG. 4C, in the plot 400c there is also illustrated an effect of implementing embodiments of the MPPT algorithms and processes as applied to embodiments of voltage balancing and extracted output power optimizer circuits and corresponding methods for voltage balancing using maximum power point tracking and control of power generation on output power extraction from the shaded and unshaded DC voltage source strings. In the parallel operation of the experimental verification of the three DC voltage source strings for voltage balancing implemented by embodiments of voltage balancing and extracted output power optimizer circuits, although the open circuit voltage of DC voltage source string no. 2 that was shaded was lower than the MPP voltage of the unshaded DC voltage source strings nos. 1 and 3, the embodiments of the voltage balancing and optimizing extracted output power circuit topologies and processes can enable each DC voltage source string to operate at a different voltage that can provide its own MPP for a corresponding DC voltage source string, for example.

Therefore, as illustrated in FIG. 4C, the experimental verification implementing embodiments of voltage balancing and extracted output power optimizer circuits and topologies for voltage balancing and optimizing extracted output power, the global MPPT for the power generation system is not trapped at the MPP of DC voltage source strings nos. 1 and 3, and each string can operate at its desired voltage. As a result, the DC voltage source string no. 2 is sharing power for power generation, for example, unlike in the power generation experimental operation without implementing embodiments of voltage balancing and extracted output power optimizer circuits and topologies, such as also illustrated in the plot 400c of FIG. 4C.

By measuring the current of the DC resistive load connected to the buck converter from FIG. 4C i.e. without implementing embodiments of voltage balancing and extracted output power optimizing circuits and topologies, and with implementing embodiments of voltage balancing and extracted output power optimizing circuits and topologies, as illustrated in the plot 400c of in FIG. 4C, the percentage increase in output power after applying the voltage balancing and extracted output power optimizing can be calculated or determined from the square of the current values as, for example:

$$\% \text{ Power increase} = \frac{4.16^2 - 3.84^2}{3.84^2} = 17\%.$$

Referring to FIG. 3B, there is illustrated a block diagram of the generalized system 300a, including the controller/processor 352, a memory 354 and an interface 358, as can be used for implementing apparatuses and methods for voltage balancing and extracted output power optimizing, such as using maximum power point tracking and control of power generation. It should be understood that the calculations in relation to the voltage load balancing and optimizing of extracted output power can be performed by any suitable controller or computer system. The controller or processor, such as the controller/processor 352, as can be implemented in Matlab or in a controller implementing voltage balancing and extracted output power optimizing, can be any suitable type of controller, processor, computer system or the like. Although it should be understood that the generalized system 300a can represent, for example, a stand-alone computer, computer terminal, portable computing device, networked computer or computer terminal, networked portable device, programmable logic controller (PLC) or an application specific integrated circuit (ASIC).

Data can be entered into controller/processor 352 via any suitable type of user interface 358, or can be received by the system 300a through the interface 358. The data, programs and instructions to implement voltage balancing and extracted output power optimizing can be stored in any suitable type of computer readable and programmable memory, such as a non-transitory, computer readable storage medium. Calculations or operations in voltage balancing and extracted output power optimizing such as described herein, can be performed by any suitable type of controller, processor, computer processor or the like, such as can be performed by the controller/processor 352, which can be any suitable type of computer processor, programmable logic controller (PLC) or application specific integrated circuit (ASIC), for example. Information and data, such as in relation to voltage balancing and extracted output power optimizing, can be displayed to the user on a display 356, which can be any suitable type of computer display or digital display, for example, such as a liquid crystal display (LCD).

The controller/processor 352 can be associated with, or incorporated into, any suitable type of computing device, for example, a personal computer, a PLC or ASIC. The display 356, the controller/processor 352, the memory 354, and various associated computer readable media are in communication with one another by a suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Also, examples of magnetic recording apparatus that can be used in addition to the memory, or in place of the memory, can include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all suitable computer-readable media.

Embodiments of apparatuses and methods for voltage balancing and extracted output power optimizing coupled with renewable energy sources using maximum power point tracking and control of power generation provide a topology that can provide an increase in the harvested energy in power generation systems, such as PV power plants. In this regard, the present apparatuses and methods for voltage balancing and extracted output power optimizing can enable each DC voltage source string in a power generation system to operate at a voltage that corresponds to its Maximum Power Point (MPP), for example. Also, the embodiments of apparatuses and methods for voltage balancing and extracted output power optimizing provide MPPT techniques and methods having a decentralized control approach that can assist in addressing a multidimensional search problem in applying voltage balancing and extracted output power optimizing topology in large scale PV plants, for example.

The embodiments of apparatuses and methods for voltage balancing and extracted output power optimizing of FIGS. 1A-1C, described in relation to voltage balancing, voltage adjustment or control of current flowing in corresponding DC voltage source strings as can have different DC voltages, such as can be suitable for series connected DC output wind applications, can also be utilized in conjunction with embodiments of MPPT algorithms, processes, techniques or methods, as power system optimizer circuits, such as can be utilized in photovoltaic applications. Such embodiments of power system optimizer circuits in a power generation system include embodiments of voltage balancing and extracted output power optimizer circuits to voltage balance or control current flowing in corresponding DC voltage source strings to optimize extracted output power from a corresponding DC voltage source string and, therefore, can optimize extracted output power from a power generation system as can also provide a PV string-based power enhancer, as well as a PV string based differential power processor, for example.

Referring now to FIGS. 2A-2E, embodiments of power system optimizer circuits including one or more voltage balancing and extracted output power optimizer circuits to voltage balance or control current flowing in corresponding DC voltage source strings in a power generation system are shown. FIGS. 2A-2E illustrate embodiments of power system optimizer circuits including one or more voltage balancing and extracted output power optimizer circuits of families of such topologies, for example.

Figure 2A:
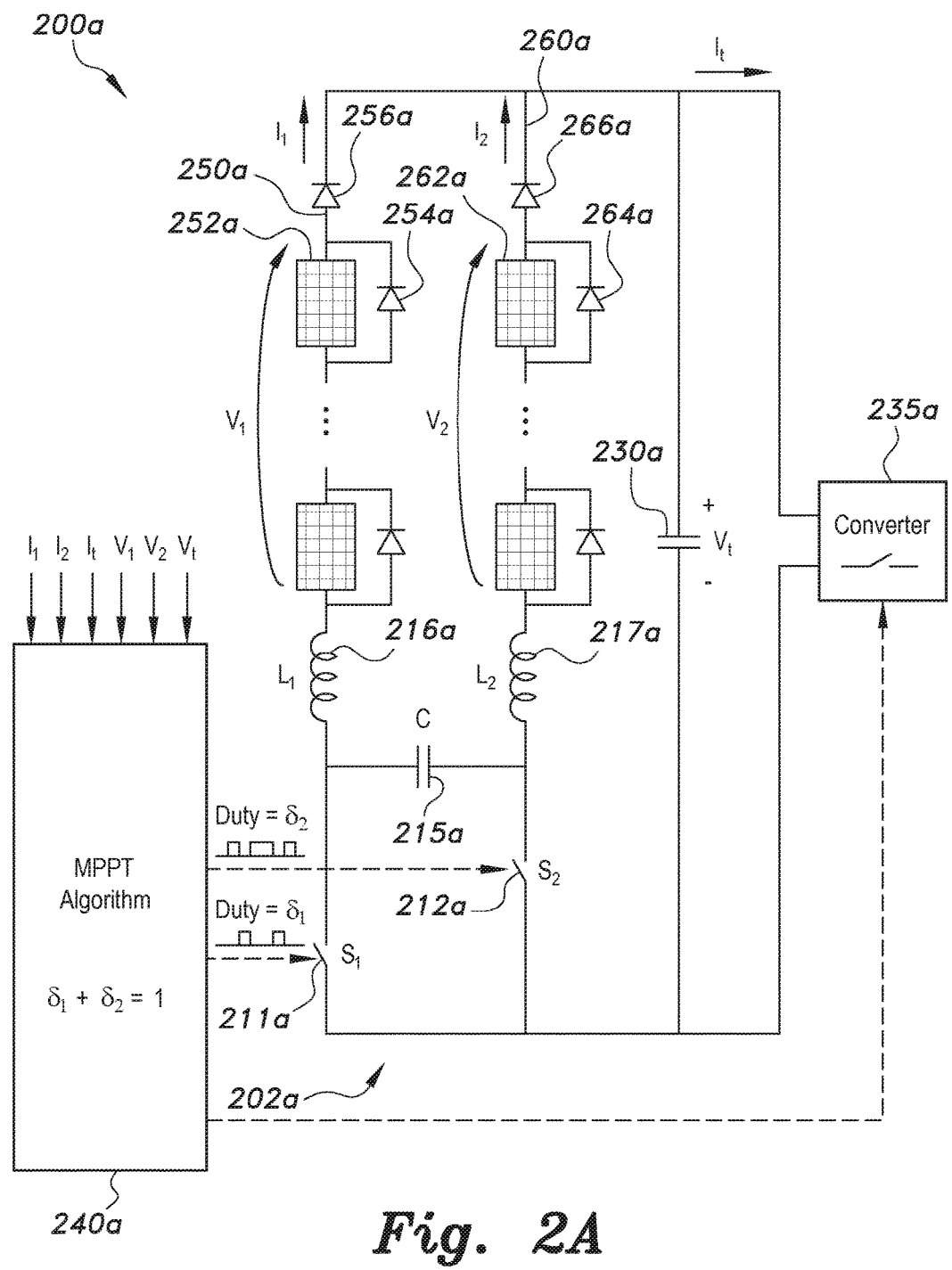
FIG. 2A illustrates a general schematic diagram illustrating an embodiment of a power generation system of a first topology including an embodiment of a power system optimizer circuit including a voltage balancing and extracted output power optimizer circuit for a pair of DC voltage source strings to voltage balance or control current flowing in a corresponding DC voltage source string according to the present invention.
Figure 2B:
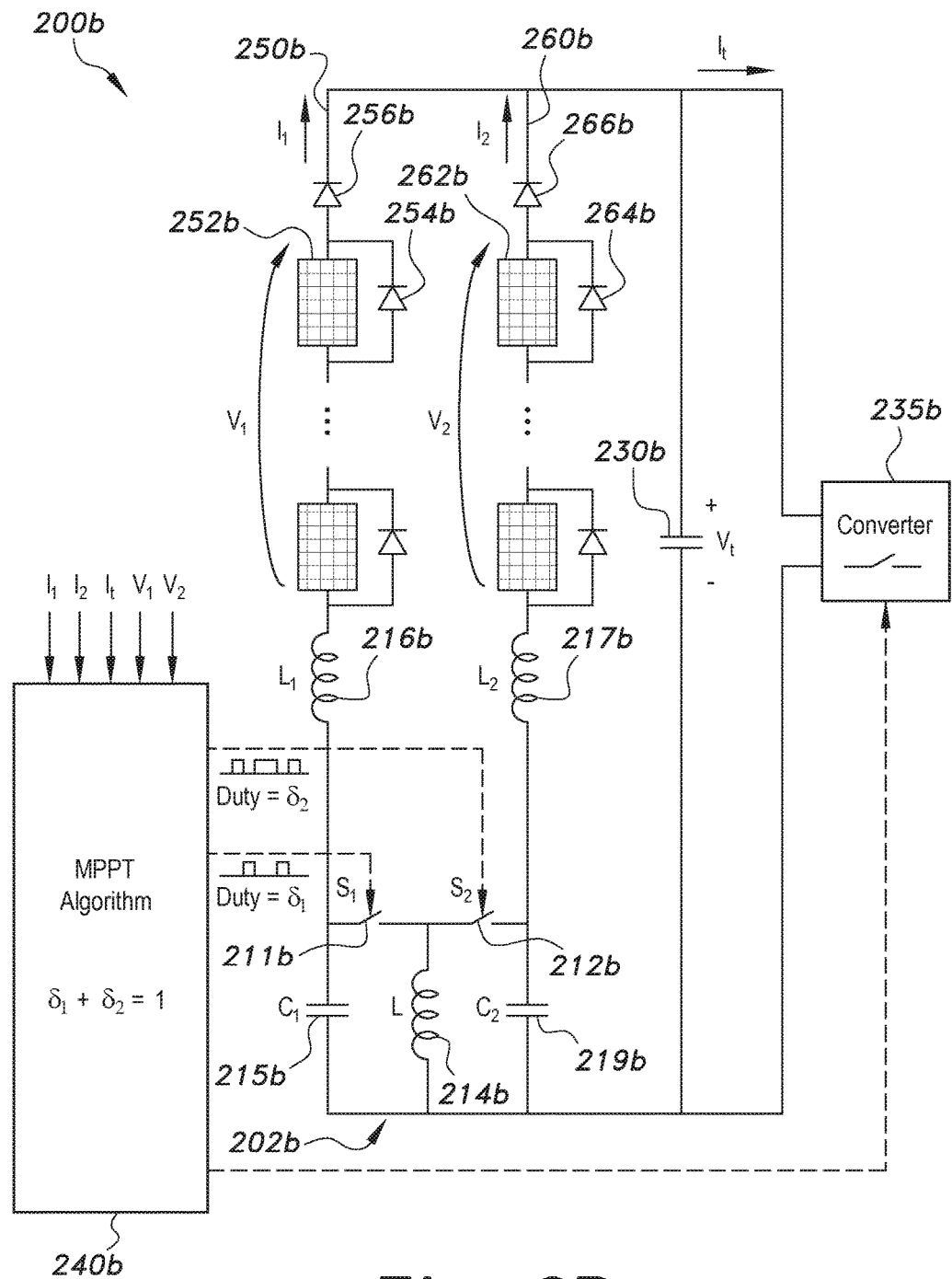
FIG. 2B illustrates a general schematic diagram illustrating an embodiment of a power generation system of a second topology including an embodiment of a power system optimizer circuit including a voltage balancing and extracted output power optimizer circuit for a pair of strings of DC voltage source strings to voltage balance or control current flowing in a corresponding DC voltage source string according to the present invention.
Figure 2C:
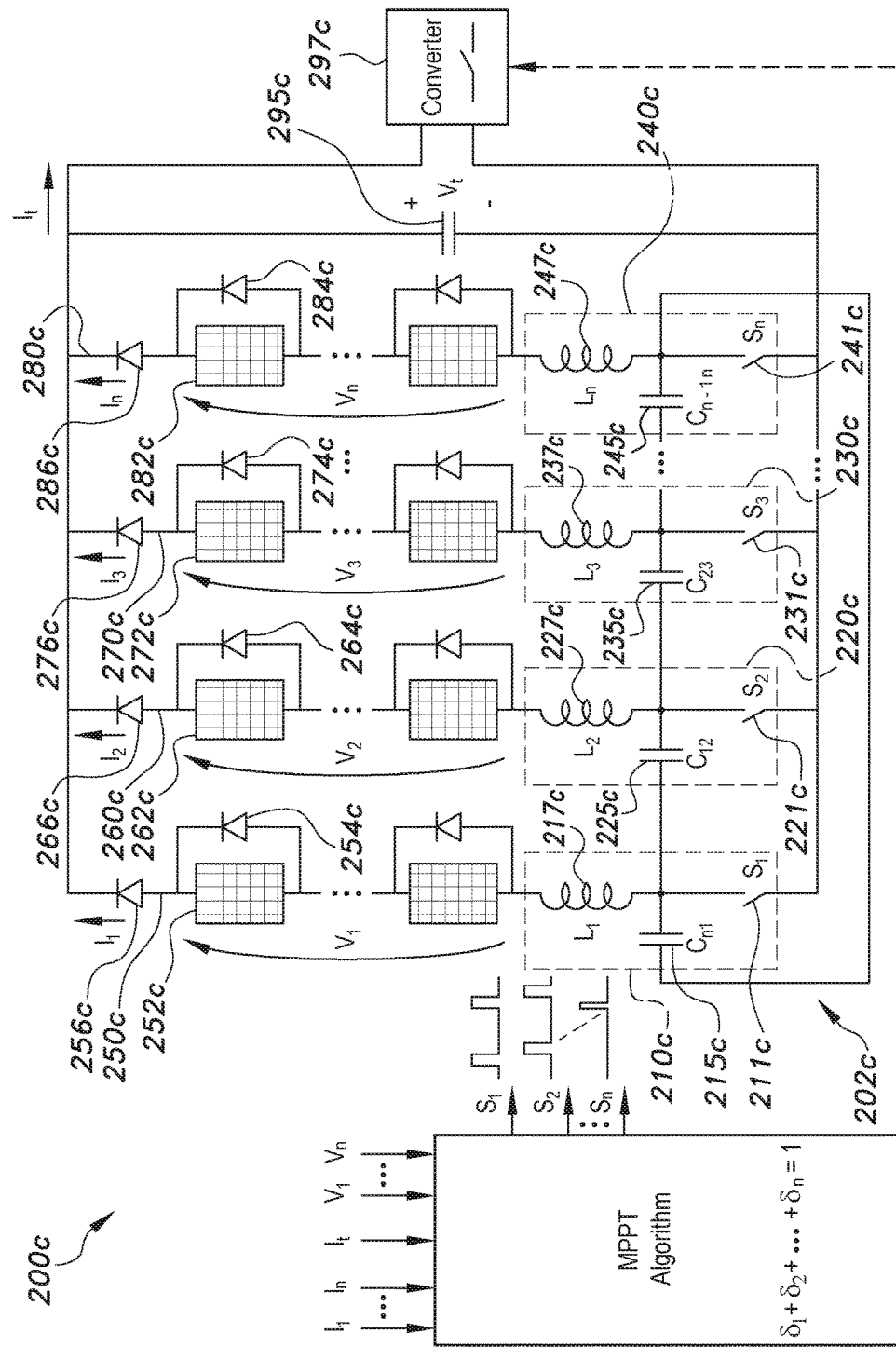
FIG. 2C illustrates a general schematic diagram illustrating an embodiment of a power generation system including an embodiment of a first topology first connection arrangement of a power system optimizer circuit including a plurality of voltage balancing and extracted output power optimizer circuits arranged in a cascade type relation to voltage balance or control current flowing in a corresponding DC voltage source string of a plurality of strings, for n strings, of DC voltage source strings, each voltage balancing and extracted output power optimizer circuit having a single switch to control current in a corresponding DC voltage source string according to the present invention.
Figure 2D:
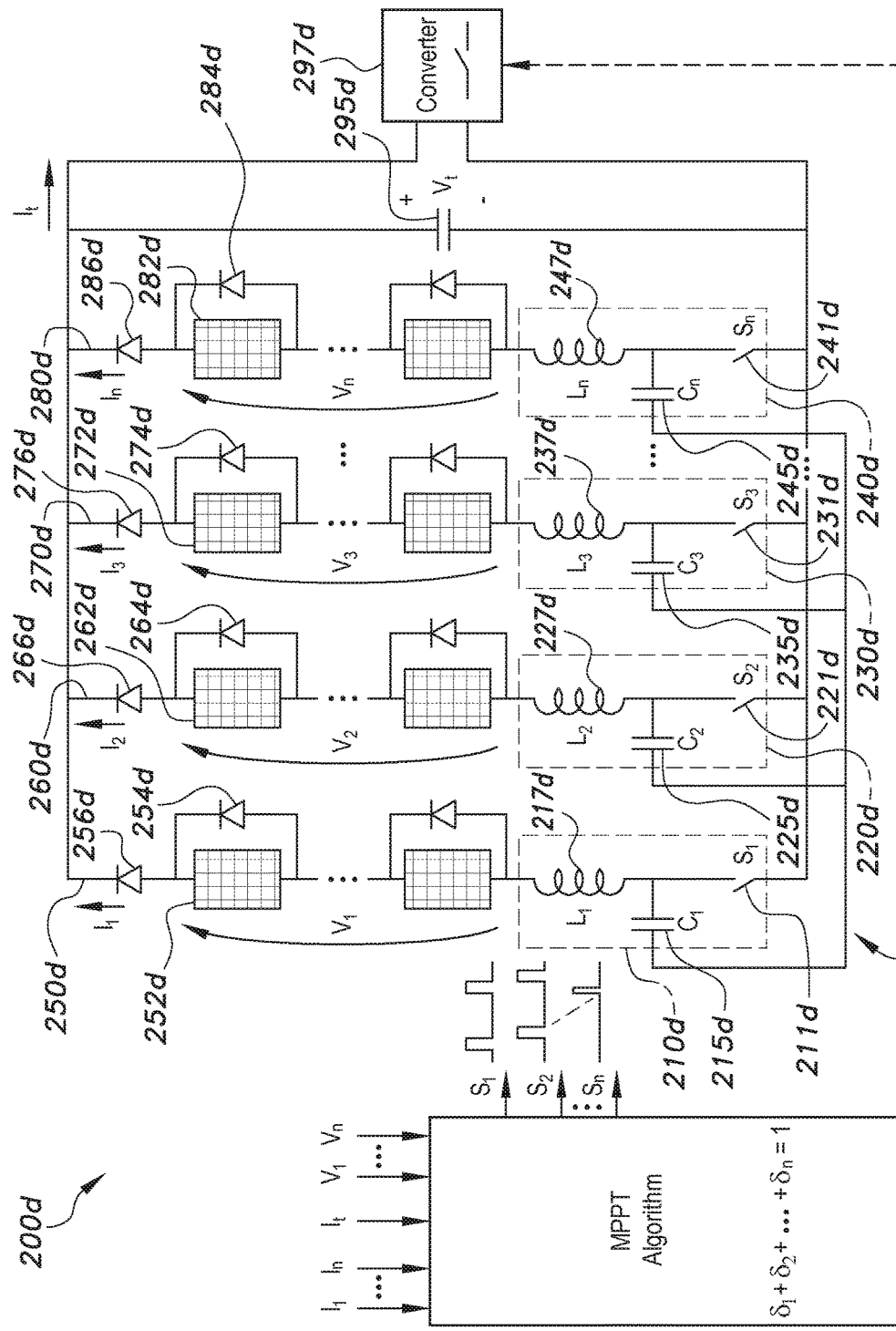
FIG. 2D illustrates a general schematic diagram illustrating an embodiment of a power generation system including an embodiment of a power system optimizer circuit including a first topology second connection arrangement of a plurality of voltage balancing and extracted output power optimizer circuits arranged in a cascade type relation to voltage balance or control current flowing in a corresponding DC voltage source string of a plurality of strings, for n strings, of DC voltage source strings, each voltage balancing and extracted output power optimizer circuit having a single switch to control current in a corresponding DC voltage source string according to the present invention.
Figure 2E:
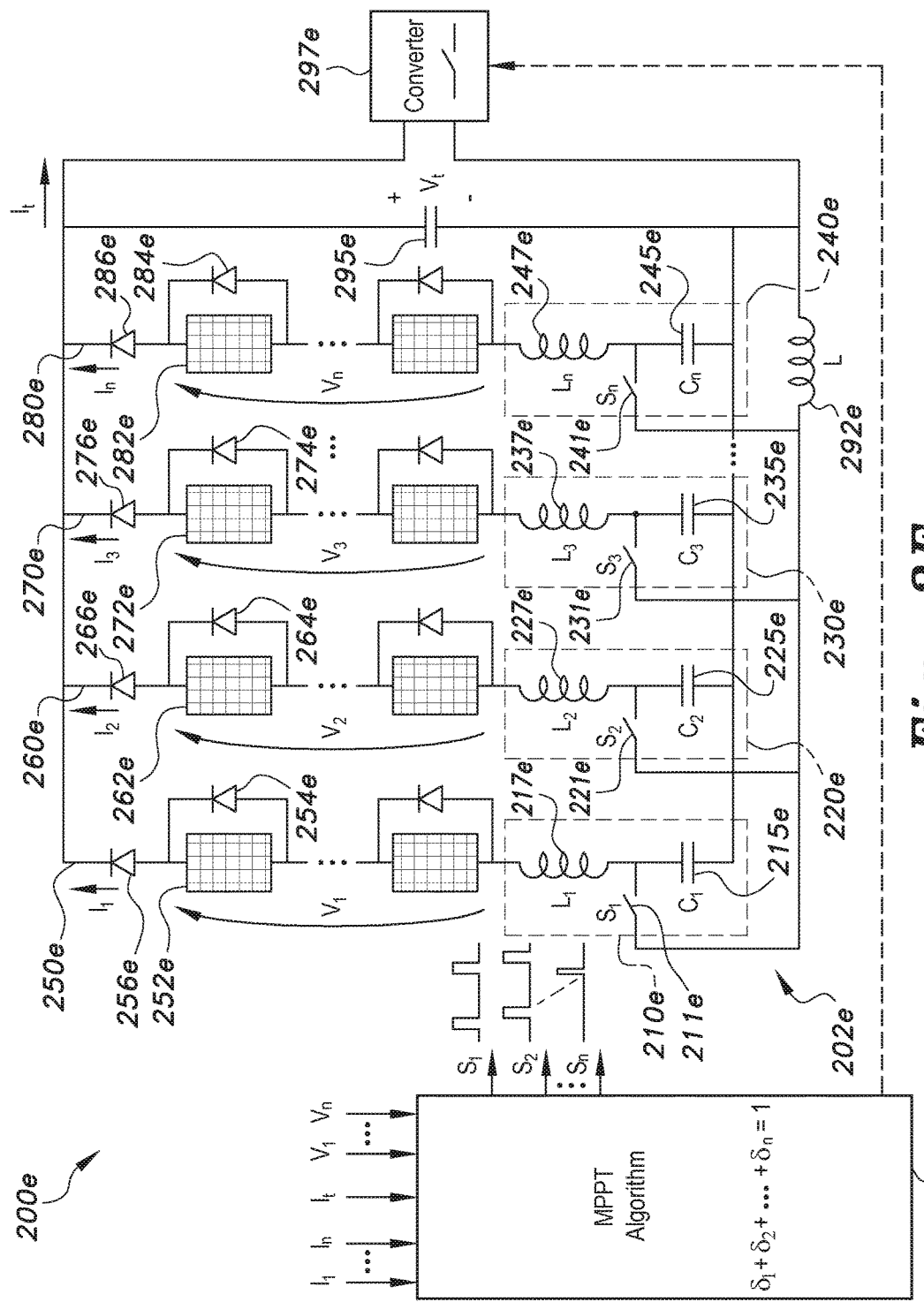
FIG. 2E illustrates a general schematic diagram illustrating an embodiment of a power generation system including an embodiment of a power system optimizer circuit including a second topology of a plurality of voltage balancing and extracted output power optimizer circuits arranged in a cascade type relation to voltage balance or control current flowing in a corresponding DC voltage source string of a plurality of strings, for n strings, of DC voltage source strings, each voltage balancing and extracted output power optimizer circuit having a single switch to control current in a corresponding DC voltage source string according to the present invention.

FIGS. 2A and 2B show a first group of two topology families of power system optimizer circuit topologies applied to a two string PV power generation system. FIGS. 2C, 2D and 2E show a second group of topology families with different possible connections for a general n-string PV system where the power system optimizer circuits are shown as modules.

Referring now to FIG. 2A, there is illustrated a general schematic diagram illustrating an embodiment of a power generation system 200a of a first topology including an embodiment of power system optimizer circuit including a voltage balancing and extracted output power optimizer circuit 202a to voltage balance or control current flowing in corresponding DC voltage source strings. The power generation system 200a can implement embodiments of an MPPT control and process to voltage balance strings of DC voltage sources and to optimize extracted output power from corresponding DC voltage source strings. In this regard, the power generation system 200a includes an MPPT power system controller 240a similar to the MPPT power system controller 500 or the generalized system 500a, as described, to voltage balance strings of DC voltage sources and to optimize extracted output power from corresponding DC voltage source strings.

The power generation system 200a further includes a first DC voltage source string 250a, such as having a plurality of PV panels 252a providing a voltage $V_1$ and a current $I_1$. The first DC voltage source string 250a includes a reverse blocking diode 256a to control a direction of current flow in the DC voltage source string 250a and includes a plurality of bypass diodes 254a that are respectively associated with the plurality of PV panels 252a to selectively short the current that would pass through the corresponding PV panel, as can depend on current flow in the corresponding DC voltage source string 250a.

The power generation system 200a also includes a second DC voltage source string 260a, such as having a plurality of PV panels 262a providing a voltage $V_2$ and a current $I_2$. The second DC voltage source string 260a includes a reverse blocking diode 266a to control a direction of current flow in the DC voltage source string 260a and a plurality of bypass diodes 264a are respectively associated with the plurality of PV panels 262a to selectively short the current that would pass through the corresponding PV panel, as can depend on current flow in the corresponding DC voltage source string 260a. The power generation system 200a has a DC to AC voltage converter 235a that receives a total current $I_t$ and a total voltage $V_t$, the total voltage $V_t$ generated by the power generation system 200a being indicated at 230a.

The power generation system 200a further includes the voltage balancing and extracted output power optimizer circuit 202a that includes an inductor 216a ($L_1$) and a switch 211a ($S_1$) adapted to control a current flowing in and associated in series with the first DC voltage source string 250a and includes an inductor 217a ($L_2$) and a switch 212a ($S_2$) adapted to control a current flowing and associated in series with the second DC voltage source string 260a, and a capacitor 215a (C) connected across the voltage balancing and optimizer circuit 202a between the inductor 216a ($L_1$) and the switch 211a ($S_1$) at one end and between the inductor 217a ($L_2$) and the switch 212a ($S_2$) at the other end. The MPPT power system controller 240a provides and adjusts a duty ratio $\delta_1$ for the first switch 211a ($S_1$) and a duty ratio $\delta_2$ for the second switch 212a ($S_2$), such as based on the inputs $I_1$, $I_2$, $I_t$, $V_1$, $V_2$ and $V_t$ to optimize the extracted output power for each corresponding DC voltage source string 250a and 260a, for example.

FIG. 2B illustrates a general schematic diagram illustrating an embodiment of a power generation system 200b of a second topology including an embodiment of a power system optimizer circuit including a voltage balancing and extracted output power optimizer circuit 202b to voltage balance or control current flowing in corresponding DC voltage source strings. The power generation system 200b can implement embodiments of an MPPT control and process to voltage balance strings of DC voltage sources and to optimize extracted output power from corresponding DC voltage source strings. In this regard, the power generation system 200b includes an MPPT power system controller 240b similar to the MPPT power system controller 500 or the generalized system 500a, as described, to voltage balance strings of DC voltage sources and to optimize extracted output power from corresponding DC voltage source strings.

The power generation system 200b further includes a first DC voltage source string 250b, such as having a plurality of PV panels 252b providing a voltage $V_1$ and a current $I_1$. The first DC voltage source string 250b includes a reverse blocking diode 256b to control a direction of current flow in the DC voltage source string 250b and a plurality of bypass diodes 254b are respectively associated with the plurality of PV panels 252b to selectively short the current that would pass through the corresponding PV panel, as can depend on current flow in the corresponding DC voltage source string 250b.

The power generation system 200b also includes a second DC voltage source string 260b, such as having a plurality of PV panels 262b providing a voltage $V_2$ and a current $I_2$. The second DC voltage source string 260b includes a reverse blocking diode 266b to control a direction of current flow in the DC voltage source string 260b and a plurality of bypass diodes 264b are respectively associated with the plurality of PV panels 262b to selectively short the current that would pass through the corresponding PV panel, as can depend on current flow in the corresponding DC voltage source string 260b. The power generation system 200b has a DC to AC voltage converter 235b that receives a total current $I_t$ and a total voltage $V_t$, the total voltage $V_t$ generated by the power generation system 200b being indicated at 230b.

The power generation system 200b further includes the voltage balancing and extracted output power optimizer circuit 202b that includes an inductor 216b ($L_1$) in series with a capacitor 215b ($C_1$) and a switch 211b ($S_1$) adapted to control a current flowing in the first DC voltage source string 250b and includes an inductor 217b ($L_2$) in series with a capacitor 219b ($C_2$) and a switch 212b ($S_2$) adapted to control a current flowing in the second DC voltage source string 260b. An inductor 214b (L) is connected between the switch 211b ($S_1$) and the switch 212b ($S_2$), and the switch 211b ($S_1$) and the switch 212b ($S_2$) dividing the current of the inductor 214b (L) according to their operating operation point, for example. The MPPT power system controller 240b provides and adjusts a duty ratio $\delta_1$ for the first switch 211b ($S_1$) and a duty ratio $\delta_2$ for the second switch 212b ($S_2$), such as based on the inputs $I_1$, $I_2$, $I_t$, $V_1$, $V_2$ and $V_t$ to optimize the extracted output power for each corresponding DC voltage source string 250b and 260b, as well as can provide for voltage balancing for the DC voltage source strings 250b and 260b, for example.

FIG. 2C illustrates a general schematic diagram illustrating an embodiment of a power generation system 200c including an embodiment of a first topology of a power system optimizer circuit 202c in a first connection arrangement of a plurality of voltage balancing and extracted output power optimizer circuits 210c, 220c, 230c and 240c to voltage balance or control current flowing in corresponding DC voltage source strings, for n strings, such as where n=4, of DC voltage sources to optimize extracted output power from a corresponding DC voltage source string. The voltage balancing and extracted output power optimizer circuits 210c, 220c, 230c and 240c each have a single switch to control current in a corresponding DC voltage source string. Also, the plurality of voltage balancing and extracted output power optimizer circuits 210c, 220c, 230c and 240c are arranged in a cascade type arrangement in the power system optimizer circuit 202c. The power generation system 200c also includes and specifically illustrates DC voltage source strings 250c, 260c, 270c and 280c, for n=4 DC voltage source strings, for example.

As illustrated in FIG. 2C, each voltage balancing and extracted output power optimizer circuit 210c, 220c, 230c and 240c is respectively communicatively connected to at least one other of the voltage balancing and extracted output power optimizer circuits 210c, 220c, 230c and 240c in a cascaded type relation to provide voltage balancing, as well as can be used in conjunction with the MPPT power system controller 300 or the generalized system 300a, as in FIGS. 3A and 3B, to voltage balance or control current flowing in corresponding DC voltage source strings to optimize the extracted output power from the corresponding DC voltage source strings, for example, in the power generation system 200c.

However, the power system optimizer circuit 202c topology has been modified from that shown in the power system optimizer circuit including the voltage balancing and extracted output power optimizer circuit 202a topology of FIG. 2A and in the power system optimizer circuit including the voltage balancing and extracted output power optimizer circuit 202b topology of FIG. 2B, for example, in that the number of switches in each of the voltage balancing and extracted output power optimizer circuits 210c, 220c, 230c and 240c has been reduced, such as use of a single switch associated with each of the voltage balancing and extracted output power optimizer circuits 210c, 220c, 230c and 240c. However, use of such reduced number of switches, as can be reverse blocking switches, typically will have a higher rating for a switch, for example. The power system optimizer circuit 202c topology can enhance reliability for voltage balancing and extracted output power optimization in that the number of components in the power optimizer circuit 202c topology can be reduced, as well as can provide a reduced cost for the voltage balancing and extracted output power optimizer circuits, for example.

Also, the operation of the power system optimizer circuit 202c topology is similar to that described in relation to the operation of the power system optimizer circuit including the voltage balancing and extracted output power optimizer circuit 202a topology of FIG. 2A and the power system optimizer circuit including the voltage balancing and extracted output power optimizer circuit 202b topology of FIG. 2B, in that the current into the PV panels in the corresponding DC voltage source string is controlled to a value which can provide a maximum extracted output power from the corresponding DC voltage source strings.

The functionality of the power system optimizer circuit 202c topology of FIG. 2C likewise provides for power optimizing as current flowing in a corresponding DC voltage source string, such as including one or more PV panels, is controlled to a value which can enhance providing a maximum extracted output power from the corresponding DC voltage source string, by control of the current for the corresponding DC voltage source string by a corresponding single switch, such as by a MPPT power system controller 290c, in the power generation system 200c, similar to the MPPT power system controller 300 or the generalized system 300a, as described, for example.

Therefore, the power system optimizer circuit 202c topology is somewhat different from that of the power system optimizer circuit including the voltage balancing and extracted output power optimizer circuit 202a topology of FIG. 2A and the power system optimizer circuit including the voltage balancing and extracted output power optimizer circuit 202b topology of FIG. 2B, where the current in corresponding DC voltage source strings is controlled by a corresponding voltage balancing and extracted output power optimizer circuit including at least two switches. In this regard, in the power system optimizer circuit 202c topology, a single switch is associated with a corresponding voltage balancing and extracted output power optimizer circuit and such single switch is used to control the current in a corresponding DC voltage source string, for example.

As illustrated in FIG. 2C, for example, the voltage balancing and extracted output power optimizer circuit 210c is associated with the DC voltage source string 250c having a string voltage $V_1$ and a string current $I_1$, the voltage balancing and extracted output power optimizer circuit 220c is associated with the DC voltage source string 260c having a string voltage $V_2$ and a string current $I_2$, the voltage balancing and extracted output power optimizer circuit 230c is associated with the DC voltage source string 270c having a string voltage $V_3$ and a string current $I_3$, and the voltage balancing and extracted output power optimizer circuit 240c is associated with the DC voltage source string 280c having a string voltage $V_n$ as can correspond to $V_4$ and a string current $I_n$ as can correspond to $I_4$, when the number, n, of DC voltage source strings in the power generation circuit 200c is equal to four in FIG. 2C, for example.

The DC voltage source strings 250c, 260c, 270c and 280c respectively include a plurality of DC voltage sources, such as PV panels 252c, 262c, 272c and 282c, as renewable energy sources, as well as can respectively include a reverse blocking diode 256c, 266c, 276c and 286c to control a direction of current flow in corresponding DC voltage source strings 250c, 260c, 270c and 280c. The DC voltage source strings 250c, 260c, 270c and 280c also include a plurality of bypass diodes 254c, 264c, 274c and 284c respectively associated with a corresponding PV panel 252c, 262c, 272c and 282c to selectively short the current that would pass through the corresponding PV panel, as can depend on current flow in the corresponding DC voltage source string. The power generation system 200c has a DC to AC voltage converter 297c that receives a total current $I_t$ and a total voltage $V_t$, the total voltage $V_t$ generated by the power generation system 200c being indicated at 295c.

The voltage balancing and extracted output power optimizer circuit 210c includes a switch 211c ($S_1$), as can be reverse blocking switch, such as a MOSFET, as can be in series with a corresponding diode to control a direction of current flow and a relatively small filter, such as can be provided at least in part by an inductance $217c$ ($L_1$) of the voltage balancing and extracted output power optimizer circuit $210c$ associated with the DC voltage source string $250c$. While the single switch $211c$ ($S_1$) controls the current in the PV panels $252c$ in the DC voltage source string $250c$, the voltage difference between the DC voltage source strings $250c$ and $280c$ is provided or constructed across a capacitor $215c$ ($C_{n1,\ n=4}$), as can also provide filtering in the voltage balancing and extracted output power optimizer circuit $210c$. The current flowing in the DC voltage source string $250c$ is controlled by or at least in part by the duty ratio ($\delta_1$) of the corresponding switch $211c$ ($S_1$), such as can be a reverse blocking switch, to voltage balance or control current flowing in the corresponding DC voltage source string $250c$ in the power generation system $200c$.

The voltage balancing and extracted output power optimizer circuit $220c$ includes a switch $221c$ ($S_2$), as can be reverse blocking switch, such as a MOSFET, as can be in series with a corresponding diode to control a direction of current flow and a relatively small filter, such as can be provided at least in part by an inductance $227c$ ($L_2$) of the voltage balancing and extracted output power optimizer circuit $220c$ associated with the DC voltage source string $260c$. While the single switch $221c$ ($S_2$) controls the current in the PV panels $262c$ in the DC voltage source string $260c$, the voltage difference between the DC voltage source strings $250c$ and $260c$ is provided or constructed across a capacitor $225c$ ($C_{12}$), as can also provide filtering in the voltage balancing and extracted output power optimizer circuit $220c$. The current flowing in the DC voltage source string $260c$ is controlled by or at least in part by the duty ratio ($\delta_2$) of the corresponding switch $221c$ ($S_2$), such as can be a reverse blocking switch, to voltage balance or control current flowing in the corresponding DC voltage source string $260c$ in the power generation system $200c$.

The voltage balancing and extracted output power optimizer circuit $230c$ includes a switch $231c$ ($S_3$), as can be reverse blocking switch, such as a MOSFET, as can be in series with a corresponding diode to control a direction of current flow and a relatively small filter, such as can be provided at least in part by an inductance $237c$ ($L_3$) of the voltage balancing and extracted output power optimizer circuit $230c$ associated with the DC voltage source string $270c$. While the single switch $231c$ ($S_3$) controls the current in the PV panels $272c$ in the DC voltage source string $270c$, the voltage difference between the DC voltage source strings $260c$ and $270c$ is provided or constructed across a capacitor $235c$ ($C_{23}$), as can also provide filtering in the voltage balancing and extracted output power optimizer circuit $230c$. The current flowing in the DC voltage source string $270c$ is controlled by or at least in part by the duty ratio ($\delta_3$) of the corresponding switch $231c$ ($S_3$), such as can be a reverse blocking switch, to voltage balance or control current flowing in the corresponding DC voltage source string $270c$ in the power generation system $200c$.

The voltage balancing and extracted output power optimizer circuit $240c$ includes a switch $241c$ ($S_{n,\ n=4}$), as can be reverse blocking switch, such as a MOSFET, as can be in series with a corresponding diode to control a direction of current flow and a relatively small filter, such as can be provided at least in part by an inductance $247c$ ($L_{n,\ m-4}$) of the voltage balancing and extracted output power optimizer circuit $240c$ associated with the DC voltage source string $280c$. While the single switch $241c$ ($S_{n,\ n=4}$) controls the current in the PV panels $282c$ in the DC voltage source string $280c$, the voltage difference between the DC voltage source strings $270c$ and $280c$ is provided or constructed across a capacitor $245c$ ($C_{n-1n,\ n=4}$), as can also provide filtering in the voltage balancing and extracted output power optimizer circuit $240c$. The current flowing in the DC voltage source string $280c$ is controlled by or at least in part by the duty ratio ($\delta_{n,\ n=4}$) of the corresponding switch $241c$ ($S_{n,\ n=4}$), such as can be a reverse blocking switch, to voltage balance or control current flowing in the corresponding DC voltage source string $280c$ in the power generation system $200c$.

FIG. 2D illustrates a general schematic diagram illustrating an embodiment of a power generation system $200d$ including an embodiment of a first topology of a power system optimizer circuit $202d$ in a second connection arrangement of a plurality of voltage balancing and extracted output power optimizer circuits $210d$, $220d$, $230d$ and $240d$ to voltage balance or control current flowing in corresponding DC voltage source strings of a plurality of strings, for n strings, as can correspond to n=4 for four DC voltage source stings, in the embodiment of the power generation system $200d$ to optimize extracted output power from corresponding DC voltage source strings.

The voltage balancing and extracted output power optimizer circuits $210d$, $220d$, $230d$ and $240d$ each have a single switch to control current in the corresponding DC voltage source string. Also, the voltage balancing and extracted output power optimizer circuits $210d$, $220d$, $230d$ and $240d$ are arranged in the power system optimizer circuit $202d$ in a cascade type relation or arrangement. The power generation system $200d$ also includes and specifically illustrates DC voltage source strings $250d$, $260d$, $270d$ and $280d$ when the number, n, of DC voltage source strings in the power generation circuit $200d$ corresponds to four, in the power generation system $200d$ in FIG. 2D, for example.

As illustrated in FIG. 2D, the voltage balancing and extracted output power optimizer circuits $210d$, $220d$, $230d$ and $240d$ can optimize extracted output power in the corresponding DC voltage source strings $250d$, $260d$, $270d$ and $280d$, as well as can provide voltage balancing, voltage adjustment and current control in the corresponding DC voltage source strings $250d$, $260d$, $270d$ and $280d$. The power generation system $200d$ also includes a MPPT power system controller $290d$ similar to the MPPT power system controller $300$, as can be implemented by the generalized system $300a$, as in FIGS. 3A and 3B, to voltage balance, voltage adjust or control current flowing in corresponding DC voltage source strings to optimize the extracted output power from the corresponding DC voltage source strings, for example, in power generation in the power generation system $200d$.

Similar to the power system optimizer circuit $202c$ topology of FIG. 2C, the power system optimizer circuit $202d$ topology of FIG. 2D has been modified from that shown in the power system optimizer circuit including the voltage balancing and extracted output power optimizer circuit $202a$ topology of FIG. 2A and the power system optimizer circuit including the voltage balancing and extracted output power optimizer circuit $202b$ topology of FIG. 2B, for example, in that the number of switches in each of voltage balancing and extracted output power optimizer circuits $210d$, $220d$, $230d$ and $240d$ has been reduced. In this regard, each of the voltage balancing and extracted output power optimizer circuits $210d$, $220d$, $230d$ and $240d$ include a single reverse blocking switch to control current flow in the corresponding DC voltage source string, for example. However, by using of such reduced number of switches, as can be reverse blocking switches, the switches typically will have a higher rating, for example.

The power system optimizer circuit 202d topology can enhance reliability for voltage balancing and extracted output power optimization in that the number of components in the power system optimizer circuit 202d topology can be reduced, as well as can provide a reduced cost for the voltage balancing circuits, for example. Also, the capacitors in each of the string voltage balancing and extracted output power optimizer circuits 210d, 220d, 230d and 240d are connected in a parallel type relation with respect to each other in conjunction with the corresponding DC voltage source strings 250d, 260d, 270d and 280d for voltage balancing and voltage adjusting in the corresponding DC voltage source strings. Also, controlling the duty ratio of the corresponding switches in the voltage balancing and extracted output power optimizer circuits 210d, 220d, 230d and 240d can optimize the extracted output power generated by each of the corresponding DC voltage source strings 250d, 260d, 270d and 280d, for example.

Also, the operation of the power system optimizer circuit 202d topology is similar to that described in relation to the operation of the power system optimizer circuit including the voltage balancing and extracted output power optimizer circuit 202a topology of FIG. 2A and the power system optimizer circuit including the voltage balancing and extracted output power optimizer circuit 202b topology of FIG. 2B, in that the current into the PV panels in the corresponding DC voltage source string is controlled to a value which can provide a maximum extracted output power from the corresponding DC voltage source strings. The functionality of the power system optimizer circuit 202d topology of FIG. 2D likewise provides for extracted output power optimizing as current into a corresponding DC voltage source string, such as including one or more PV panels, is controlled to a value which can enhance providing a maximum output power from the corresponding DC voltage source string, by control of the current for the corresponding DC voltage source string by a corresponding single switch, such as by a MPPT power system controller 290d in the power generation system 200d, similar to the MPPT power system controller 300 or the generalized system 300a, as described, for example.

Therefore, the power system optimizer circuit 202d topology is somewhat different from that of the power system optimizer circuit including the voltage balancing and extracted output power optimizer circuit 202a topology of FIG. 2A and the power system optimizer circuit including the voltage balancing and extracted output power optimizer circuit 202b topology of FIG. 2B, where the current in corresponding DC voltage source strings is controlled by a corresponding voltage balancing and extracted output power optimizer circuit including at least two switches. As described, in the power system optimizer circuit 202d topology a single switch is used in each of the voltage balancing and extracted output power optimizer circuits 210d, 220d, 230d and 240d to control the current in the corresponding DC voltage source string, for example.

As illustrated in FIG. 2D, for example, the voltage balancing and extracted output power optimizer circuit 210d is associated with the DC voltage source string 250d having a string voltage $V_1$ and a string current $I_1$. The voltage balancing and extracted output power optimizer circuit 220d is associated with the DC voltage source string 260d having a string voltage $V_2$ and a string current $I_2$. The voltage balancing and extracted output power optimizer circuit 230d is associated with the DC voltage source string 270d having a string voltage $V_3$ and a string current $I_3$. The voltage balancing and extracted output power optimizer circuit 240d is associated with the DC voltage source string 280d having string voltage $V_n$ as can correspond to $V_4$ and a string current $I_n$ as can correspond to $I_4$, when the number, n, of DC voltage source strings in the power generation circuit 200d is equal to four in FIG. 2D, for example.

The DC voltage source strings 250d, 260d, 270d and 280d respectively include a plurality of DC voltage sources, such as PV panels 252d, 262d, 272d and 282d, as renewable energy sources, as well as can respectively include a reverse blocking diode 256d, 266d, 276d and 286d to control a direction of current flow in the corresponding DC voltage source strings 250d, 260d, 270d and 280d. The DC voltage source strings 250d, 260d, 270d and 280d also include a plurality of bypass diodes 254d, 264d, 274d and 284d respectively associated with a corresponding PV panel 252d, 262d, 272d and 282d to selectively short the current that would pass through the corresponding PV panel, as can depend on current flow in the corresponding DC voltage source string. The power generation system 200d has a DC to AC voltage converter 297d that receives a total current $I_t$ and a total voltage $V_t$, the total voltage $V_t$ generated by the power generation system 200d being indicated at 295d.

The voltage balancing and extracted output power optimizer circuit 210d includes a switch 211d ($S_1$), as can be reverse blocking switch, such as a MOSFET, as can be in series with a corresponding diode to control a direction of current flow and a relatively small filter, such as can be provided at least in part by an inductance 217d ($L_1$) of the voltage balancing and extracted output power optimizer circuit 210d associated with the DC voltage source string 250d. While the single switch 211d ($S_1$) controls the current in the PV panels 252d in the DC voltage source string 250d, a voltage to balance or substantially balance or to control the voltage of the DC voltage source string 250d relative to the voltage of the DC voltage source strings 260d, 270d and 280d is provided or constructed across a capacitor 215d ($C_1$), as can also provide filtering in the voltage balancing and extracted output power optimizer circuit 210d. The current flowing in the DC voltage source string 250d is controlled by or at least in part by the duty ratio ($\delta_1$) of the corresponding switch 211d ($S_1$), such as can be a reverse blocking switch, to voltage balance, voltage adjust or control current flowing in the corresponding DC voltage source string 250d in the power generation system 200d.

The voltage balancing and extracted output power optimizer circuit 220d includes a switch 221d ($S_2$), as can be reverse blocking switch, such as a MOSFET, as can be in series with a corresponding diode to control a direction of current flow and a relatively small filter, such as can be provided at least in part by an inductance 227d ($L_2$) of the voltage balancing and extracted output power optimizer circuit 220d associated with the DC voltage source string 260d. While the single switch 221d ($S_2$) controls the current in the PV panels 262d in the DC voltage source string 260d, a voltage to balance or substantially balance or to control the voltage of the DC voltage source string 260d relative to the voltage of the DC voltage source strings 250d, 270d and 280d is provided or constructed across a capacitor 225d ($C_2$), as can also provide filtering in the voltage balancing and extracted output power optimizer circuit 220d. The current flowing in the DC voltage source string 260d is controlled by or at least in part by the duty ratio ($\delta_2$) of the corresponding switch 221d ($S_2$), such as can be a reverse blocking switch, to voltage balance, voltage adjust or control current flowing in the corresponding DC voltage source string 260d in the power generation system 200d.

The voltage balancing and extracted output power optimizer circuit 230d includes a switch 231d ($S_3$), as can be reverse blocking switch, such as a MOSFET, as can be in series with a corresponding diode to control a direction of current flow and a relatively small filter, such as can be provided at least in part by an inductance 237d ($L_3$) of the voltage balancing and extracted output power optimizer circuit 230d associated with the DC voltage source string 270d. While the single switch 231d ($S_3$) controls the current in the PV panels 272d in the DC voltage source string 270d, a voltage to balance or substantially balance or to control the voltage of the DC voltage source string 270d relative to the voltage of the DC voltage source strings 250d, 260d and 280d is provided or constructed across a capacitor 235d ($C_3$), as can also provide filtering in the voltage balancing and extracted output power optimizer circuit 230d. The current flowing in the DC voltage source string 270d is controlled by or at least in part by the duty ratio ($\delta_3$) of the corresponding switch 231d ($S_3$), such as can be a reverse blocking switch, to voltage balance, voltage adjust or control current flowing in the corresponding DC voltage source string 270d in the power generation system 200d.

The voltage balancing and extracted output power optimizer circuit 240d includes a switch 241d ($S_{n,\ n=4}$), as can be reverse blocking switch, such as a MOSFET, as can be in series with a corresponding diode to control a direction of current flow and a relatively small filter, such as can be provided at least in part by an inductance 247d ($L_{n,\ n=4}$) of the voltage balancing and extracted output power optimizer circuit 240d associated with the DC voltage source string 280d. While the single switch 241d ($S_{n,\ n=4}$) controls the current in the PV panels 282d in the DC voltage source string 280d, a voltage to balance or substantially balance or to control the voltage of the DC voltage source string 280d relative to the voltage of the DC voltage source strings 250d, 260d and 270d is provided or constructed across a capacitor 245d ($C_{n,\ n=4}$), as can also provide filtering in the voltage balancing and extracted output power optimizer circuit 240d. The current flowing in the DC voltage source string 280d is controlled by or at least in part by the duty ratio ($\delta_{n,\ n=4}$) of the corresponding switch 241d ($S_{n,\ n=4}$), such as can be a reverse blocking switch, to voltage balance, voltage adjust or control current flowing in the corresponding DC voltage source string 280d the power generation system 200d.

FIG. 2E illustrates a general schematic diagram illustrating an embodiment of a power generation system 200e including an embodiment of a second topology of a power system optimizer circuit 202e to voltage balance or control current flowing in corresponding DC voltage source strings a plurality of strings, for n strings, as can correspond to n=4 for four DC voltage source strings, in the power generation system 200e, of DC voltage sources to voltage balance or control current flowing in corresponding DC voltage source strings to optimize extracted output power from corresponding DC voltage source strings. The power system optimizer circuit 202e has a plurality of voltage balancing and extracted output power optimizer circuits 210e, 220e, 230e and 240e each having a single switch to control current in the corresponding DC voltage source string. The power generation system 200e also includes and specifically illustrates DC voltage source strings 250e, 260e, 270e and 280e as can correspond to n=4, for example.

As illustrated in FIG. 2E, the plurality of voltage balancing and extracted output power optimizer circuits 210e, 220e, 230e and 240e are arranged in a cascaded type relation to voltage balance or control current flowing in the corresponding DC voltage source strings to optimize extracted output power in the corresponding DC voltage source strings 250e, 260e, 270e and 280e, as well as can provide voltage balancing, voltage adjustment and current control in the corresponding DC voltage source strings 250e, 260e, 270e and 280e. The power generation system 200e also includes a MPPT power system controller 290e similar to the MPPT power system controller 300 or the generalized system 300a, as in FIGS. 3A and 3B, to voltage balance, voltage adjust or control current flowing in corresponding DC voltage source strings as can implement voltage balancing and optimizing extracted output power from corresponding DC voltage source strings, for example, for power generation in the power generation system 200e.

Similar to the power system optimizer circuit 202c topology of FIG. 2C and the power system optimizer circuit 202d of FIG. 2D, the power system optimizer circuit 202e topology of FIG. 2E has been modified from that shown in the power system optimizer circuit including the voltage balancing and extracted output power optimizer circuit 202a topology of FIG. 2A and the power system optimizer circuit including the voltage balancing and extracted output power optimizer circuit 202b topology of FIG. 2B, for example, in that the number of switches in each of voltage balancing and extracted output power optimizer circuits 210e, 220e, 230e and 240e has been reduced. In this regard, each of voltage balancing and extracted output power optimizer circuits 210e, 220e, 230e and 240e include a single reverse blocking switch to control current flow in the corresponding DC voltage source string, for example. However, by using of such reduced number of switches, as can be reverse blocking switches, the switches typically will have a higher rating, for example.

The power system optimizer circuit 202e topology can enhance reliability for voltage balancing and extracted output power optimization in that the number of components in the power system optimizer circuit 202e topology can be reduced, as well as can provide a reduced cost for the voltage balancing and extracted output power optimizing circuits, for example. Also, the capacitors in each of the voltage balancing and extracted output power optimizer circuits 210e, 220e, 230e and 240e are connected in a parallel type relation with respect to each other and in a series type relation in conjunction with the corresponding DC voltage source strings 250e, 260e, 270e and 280e for voltage balancing, voltage adjustment and to optimize extracted output power. Also, the duty ratio of the corresponding switch in the voltage balancing and extracted output power optimizer circuits 210e, 220e, 230e and 240e is controlled to control current flowing in a corresponding DC voltage source string to optimize the extracted output power generated by each of the corresponding DC voltage source strings 250e, 260e, 270e and 280e, for example.

Also, the operation of the power system optimizer circuit 202e topology is similar to that described in relation to the operation the power system optimizer circuit including the voltage balancing and extracted output power optimizer circuit 202a topology of FIG. 2A and the power system optimizer circuit including the voltage balancing and extracted output power optimizer circuit 202b topology of FIG. 2B, in that the current into the PV panels in the corresponding DC voltage source string is controlled to a value which can provide a maximum extracted output power from the corresponding DC voltage source strings. The functionality of the power system optimizer circuit 202e topology of FIG. 2E likewise provides for power optimizing as current in a DC voltage source string, such as including one or more PV panels, is controlled to a value which can enhance providing a maximum extracted output power from the corresponding DC voltage source string, by control of the current for the corresponding DC voltage source string by a corresponding single switch, such as by control of the selective opening and closing of the switches by a MPPT power system controller 290e in the power generation system 200e, similar to the MPPT power system controller 300 or the generalized system 300a, as described, for example.

Therefore, the power system optimizer circuit 202e topology is somewhat different from that of the power system optimizer circuit including the voltage balancing and extracted output power optimizer circuit 202a topology of FIG. 2A and the power system optimizer circuit including the voltage balancing and extracted output power optimizer circuit 202b topology of FIG. 2B, where the current in corresponding DC voltage source strings is controlled by a corresponding voltage balancing and extracted output power optimizer circuit including at least two switches. However, as described, the current in the corresponding DC voltage source strings 250e, 260e, 270e and 280e is controlled by a corresponding single switch in the voltage balancing and extracted output power optimizer circuits 210e, 220e, 230e and 240e in the power system optimizer circuit 202e topology, for example.

As illustrated in FIG. 2E, for example, the voltage balancing and extracted output power optimizer circuit 210e is associated with the DC voltage source string 250e having a string voltage $V_1$ and a string current $I_1$. The voltage balancing and extracted output power optimizer circuit 220e is associated with the DC voltage source string 260e having a string voltage $V_2$ and a string current $I_2$. The voltage balancing and extracted output power optimizer circuit 230e is associated with the DC voltage source string 270e having a string voltage $V_3$ and a string current $I_3$. The voltage balancing and extracted output power optimizer circuit 240e is associated with the DC voltage source string 280e having string voltage $V_n$ as can correspond to $V_4$ and a string current $I_n$ as can correspond to $I_4$, when the number, n, of DC voltage source strings in the power generation circuit 200e is equal to four in FIG. 2E, for example.

The DC voltage source strings 250e, 260e, 270e and 280e respectively include a plurality of DC voltage sources, such as PV panels 252e, 262e, 272e and 282e, as renewable energy sources, as well as can respectively include a reverse blocking diode 256e, 266e, 276e and 286e to control a direction of current flow in corresponding DC voltage source strings 250e, 260e, 270e and 280e. The DC voltage source strings 250e, 260e, 270e and 280e also include a plurality of bypass diodes 254e, 264e, 274e and 284e respectively associated with a corresponding PV panel 252e, 262e, 272e and 282e to selectively short the current that would pass through the corresponding PV panel, as can depend on current flow in the corresponding DC voltage source string. The power generation system 200e has a DC to AC voltage converter 297e that receives a total current $I_t$ and a total voltage $V_t$, the total voltage $V_t$ generated by the power generation system 200e being indicated at 295e. Also, a circuit inductance 292e (L) is provided in the power generation system 200e as an inductance corresponding to or as seen by the total current $I_t$ in the power generation system 200e, the circuit inductance 292e (L) being arranged in communication or association with the switches of the voltage balancing and extracted output power optimizer circuits 210e, 220e, 230e and 240e, for example.

The voltage balancing and extracted output power optimizer circuit 210e includes a switch 211e ($S_1$), as can be reverse blocking switch, such as a MOSFET, as can be in series with a corresponding diode to control a direction of current flow and a relatively small filter, such as can be provided at least in part by an inductance 217e ($L_1$) of the voltage balancing and extracted output power optimizer circuit 210e associated with the DC voltage source string 250e. While the single switch 211e ($S_1$) controls the current in the PV panels 252e in the DC voltage source string 250e, a voltage to balance or substantially balance or to control the voltage of the DC voltage source string 250e relative to the voltage of the DC voltage source strings 260e, 270e and 280e is provided or constructed across a capacitor 215e ($C_1$), as can also provide filtering in the voltage balancing and extracted output power optimizer circuit 210e. The current flowing in the DC voltage source string 250e is controlled by or at least in part by the duty ratio ($\delta_1$) of the corresponding switch 211e ($S_1$), such as can be a reverse blocking switch, to voltage balance, voltage adjust or control current flowing in the corresponding DC voltage source string 250e in the power generation system 200e.

The voltage balancing and extracted output power optimizer circuit 220e includes a switch 221e ($S_2$), as can be reverse blocking switch, such as a MOSFET, as can be in series with a corresponding diode to control a direction of current flow and a relatively small filter, such as can be provided at least in part by an inductance 227e ($L_2$) of the voltage balancing and extracted output power optimizer circuit 220e associated with the DC voltage source string 260e. While the single switch 221e ($S_2$) controls the current in the PV panels 262e in the DC voltage source string 260e, a voltage to balance or substantially balance or to control the voltage of the DC voltage source string 260e relative to the voltage of the DC voltage source strings 250e, 270e and 280e is provided or constructed across a capacitor 225e ($C_2$), as can also provide filtering in the voltage balancing and extracted output power optimizer circuit 220e. The current flowing in the DC voltage source string 260e is controlled by or at least in part by the duty ratio ($\delta_2$) of the corresponding switch 221e ($S_2$), such as can be a reverse blocking switch, to voltage balance, voltage adjust or control current flowing in the corresponding DC voltage source string 260e in the power generation system 200e.

The voltage balancing and extracted output power optimizer circuit 230e includes a switch 231e ($S_3$), as can be reverse blocking switch, such as a MOSFET, as can be in series with a corresponding diode to control a direction of current flow and a relatively small filter, such as can be provided at least in part by an inductance 237e ($L_3$) of the voltage balancing and extracted output power optimizer circuit 230e associated with the DC voltage source string 270e. While the single switch 231e ($S_3$) controls the current in the PV panels 272e in the DC voltage source string 270e, a voltage to balance or substantially balance or to control the voltage of the DC voltage source string 270e relative to the voltage of the DC voltage source strings 250e, 260e and 280e is provided or constructed across a capacitor 235e ($C_3$), as can also provide filtering in the voltage balancing and extracted output power optimizer circuit 230e. The current flowing in the DC voltage source string 270e is controlled by or at least in part by the duty ratio ($\delta_3$) of the corresponding switch 231e ($S_3$), such as can be a reverse blocking switch, to voltage balance, voltage adjust or control current flowing in the corresponding DC voltage source string 270e in the power generation system 200e.

The voltage balancing and extracted output power optimizer circuit 240e includes a switch 241e ($S_{n,\ n=4}$), as can be reverse blocking switch, such as a MOSFET, as can be in series with a corresponding diode to control a direction of current flow and a relatively small filter, such as can be provided at least in part by an inductance 247e ($L_{n,\ n=4}$) of the voltage balancing and extracted output power optimizer circuit 240e associated with the DC voltage source string 280e. While the single switch 241e ($S_{n,\ n=4}$) controls the current in the PV panels 282e in the DC voltage source string 280e, a voltage to balance or substantially balance or to control the voltage of the DC voltage source string 280e relative to the voltage of the DC voltage source strings 250e, 260e and 270e is provided or constructed across a capacitor 245e ($C_{n,\ n=4}$), as can also provide filtering in the voltage balancing and extracted output power optimizer circuit 240e. The current flowing in the DC voltage source string 280e is controlled by or at least in part by the duty ratio ($\delta_{n,\ n=4}$) of the corresponding switch 241e ($S_{n,\ n=4}$), such as can be a reverse blocking switch, to voltage balance, voltage adjust or control current flowing in the corresponding DC voltage source string 280e in the power generation system 200e.

To illustrate the difference between the performance of embodiments of the power system optimizer circuits including voltage balancing and extracted output power optimizer circuits 202a, 202b, 202c and 202d of FIGS. 2A-2D, for example, in relation to extracted output power optimizing, simulation models of the topologies have been built and simulation results analyzed assuming normal (unshaded) conditions for the PV arrays of the corresponding DC voltage source strings. In the analyses of the simulations of the topologies of FIGS. 2A-2D, the central inverter, such as the converters 235a, 235b, 297c and 297d, was controlled to draw a maximum power current condition (i.e., a reference current communicated with central inverter).

Continuing with reference to FIG. 3A, there is illustrated a schematic block diagram of an embodiment of the MPPT power system controller 300 and process to optimize extracted output power from corresponding DC voltage source strings in embodiments of power system optimizer circuit topologies including one or more voltage balancing and extracted output power optimizer circuits for power generation systems, such as those topologies illustrated in FIGS. 2A-2E, for example. In the MPPT power system controller 300, measurement modules 302, 304 and 306 receive and measure the amount of voltage and current in corresponding DC voltage source strings, such as a current $I_1$ and a voltage $V_1$ for a first DC voltage source string, a current $I_2$ and a voltage $V_2$ for a second DC voltage source string, a current $I_3$ and a voltage $V_3$ for a third DC voltage source string, and a current $I_n$ and a voltage $V_n$ for an nth DC voltage source string.

The measured voltages and currents are provided to a corresponding global MPPT controller/processor, such as global MPPT controller/processors 308, 310 and 312 of the MPPT power system controller 300 for corresponding first through third, or nth, DC voltage source strings and the global MPPT controller/processors 308, 310 and 312 estimate the power for each string to determine a corresponding maximum power point (mpp) reference current for each string, such as reference currents $I^*_{mpp1}$ for a first DC voltage source string, $I^*_{mpp2}$ for a second DC voltage source string, $I^*_{mpp3}$ for a third DC voltage source string, and $I^*_{mppn}$ for an nth DC voltage source string, such as illustrated in FIG. 3A, for example.

The reference currents $I^*_{mpp1}$, $I^*_{mpp2}$, $I^*_{mpp3}$ to $I^*_{mppn}$ are then summed by an adder circuit 314 and provided to a MPPT system power controller/processor 320, to determine a total current $I^*_t$ to be absorbed by a central converter of the power generation system, such as the converters 235a, 235b, 297c, 297d and 297e for the respective power generation systems including the power system optimizer circuit topologies of FIGS. 2A-2E, for example. To voltage balance or control current flowing in a corresponding DC voltage source string to optimize the extracted output power for each DC voltage source string in a power generation system, the MPPT system power controller/processor 320 generates gate pulses for embodiments of power system optimizer circuits including one or more voltage balancing and extracted output power optimizer circuits and to a central converter of a power generation system so as to force the central converter to draw a total current $I^*_t$, such as by determining and setting the duty cycle of the switches $\delta_1 = I^*_{mpp1}/I^*_t$, $\delta_2 = I^*_{mpp2}/I^*_t$, $\delta_3 = I^*_{mpp3}/I^*_t$ to $\delta_n = I^*_{mppn}I^*_t$, to optimize the extracted output power from each of the DC voltage source strings of the power generation system.

The MPPT power system controller 300, implements MPPT control algorithms and processes, such as those described and implemented with respect to embodiments of power system optimizer circuits including one or more voltage balancing and extracted output power optimizer circuits of FIGS. 1A-1C, as can be applied to embodiments of power system optimizer circuits including one or more voltage balancing and extracted output power optimizer circuits topologies of FIGS. 2A-2E, in relation to voltage balancing and voltage adjustment and current control to optimize extracted output power from corresponding DC voltage source strings.

The MPPT power system controller 300, as well as the generalized system 300a, can also implement maximum power point tracking (MPPT) and maximum power point (MPP) power optimizing processes, operations and instructions, to balance and adjust voltages of and to control current flow in corresponding DC voltage source strings to optimize extracted output power from corresponding DC voltage source strings and from a power generation system, such as can be implemented by the flow charts, processes and process flow in the flow charts of FIGS. 4A and 4B, for example.

In this regard, embodiments of maximum power point tracking (MPPT) and maximum power point (MPP) power optimizing processes, operations and instructions, such as in the flowcharts of FIGS. 4A and 4B, can be implemented in embodiments of power system optimizer circuits including one or more voltage balancing and extracted output power optimizer circuits of FIGS. 1A-1C, and can be implemented in embodiments of power system optimizer circuits including one or more voltage balancing and extracted output power optimizer circuits topologies of FIGS. 2A-2E, such as in conjunction with the MPPT power system controller 300 or the generalized system 300a, to optimize extracted output power in the embodiments of power generation systems, such as a power generation system including a plurality of DC voltage source strings, such as including three DC voltage source strings, for example.

The global MPPT controller/processors 308, 310 and 312 scan the characteristic of its corresponding DC voltage source string to obtain its global maximum condition upon completion of the scanning cycle. It should be noted that, the scanning period must typically be repeated at predefined or predetermined time durations to update the system state in relation to the corresponding DC voltage source strings. To perform this updating process, a timer interrupt can be implemented in the flow process instructions or software implemented by the global MPPT controller/processors 308, 310 and 312 in conjunction with the MPPT system power controller/processor 320, for example.

Flow charts illustrating embodiments of voltage control and optimizing extracted output power to adjust or balance the voltage or control current flowing in corresponding DC voltage source strings as can be implemented by global MPPT controller/processors of the MPPT power system controller 300, such as global MPPT controller/processors 308, 310 and 312 in conjunction with the MPPT system power controller/processor 320, of the Global MPPT are shown in FIGS. 4A and 4B, for example.

It should be noted that the embodiments of MPPT power system controller, such as MPPT power system controller 300, differ from typical MPPT controllers for a central inverter. In this regard, embodiments of the MPPT power system controller, such as MPPT power system controller 300, provide information as to the summation of the string currents of the DC voltage source strings in the power generation system to a central inverter to force the central inverter to draw the total current $I^*_t$, as described, in implementing voltage control and optimizing extracted output power to adjust or balance the voltage or control current flowing in the corresponding DC voltage source strings. Also, communication between the central inverter and the MPPT power system controller, such as MPPT power system controller 300 in relation to updating the system state to optimize extracted output power in the corresponding DC voltage source strings is performed to enable efficient power system generation.

The generalized system 300a of FIG. 3B, including the controller/processor 352, the memory 354, the display 356 and the interface 358 can be used for implementing apparatuses, methods and processes of embodiments of the MPPT power system controller 300 of FIG. 3A, and the component controllers and processors thereof, such as global MPPT controller/processors 308, 310 and 312 in conjunction with the MPPT system power controller/processor 320, in implementing the dynamic processes and algorithms to voltage balance and provide adjustment and current control for corresponding strings of DC voltage sources and to optimize extracted output power from corresponding DC voltage source strings, for example.

Referring now to FIG. 4A, there is illustrated a flow chart 400a of an embodiment of a process for voltage adjustment and current control for strings of DC voltage sources to optimize extracted output power from corresponding DC voltage source strings in embodiments implementing extracted output power optimizer circuit topologies in power generation systems. The flow chart 400a determines a maximum power point current $I_{mpp}$ and a maximum power point power $P_{mpp}$ for corresponding DC voltage source strings in optimizing extracted output power and voltage balancing, such as by implementing voltage adjustment, voltage control and current control, as can be implemented by global MPPT controller/processors of the MPPT power system controller 300, such as by global MPPT controller/processors 308, 310 and 312 in conjunction with the MPPT system power controller/processor 320, for example.

The process starts at step 402. The process then proceeds to step 404 where the MPPT power system controller 300, such as by the global MPPT controller/processors 308, 310 and 312, respectively set for the corresponding DC voltage source strings $I_{ref}=I_{min}$ and $P_{mpp}=0$, where the reference current $I_{ref}$ is a reference current and $I_{min}$ is a minimum current for the corresponding DC voltage source string. At step 406, the MPPT power system controller 300, such as by the measurement modules 302, 304 and 306, receive and measure or determine the amount of voltage and current in corresponding DC voltage source strings, and based thereon, reads or determines a value of the power, P, for the corresponding DC voltage source string as P=IV, where I is the current and V is the voltage of the corresponding DC voltage source string.

For example, the measurement module 302 reads and determines $P_1=I_1V_1$ for the first DC voltage source string, the measurement module 304 reads and determines $P_2=I_2V_2$ for the second DC voltage source string and the measurement module 306 reads and determines $P_3=I_3V_3$ for the third DC voltage source string. The process then proceeds to step 308 where the MPPT power system controller 300, such as by the global MPPT controller/processors 308, 310 and 312, determines for a corresponding DC voltage source string whether $P>P_{mpp}$. For example, the global MPPT controller/processor 308 determines whether $P_1>P_{mpp1}$ for the first DC voltage source string, the global MPPT controller/processor 310 determines whether $P_2>P_{mpp2}$ for the second DC voltage source string and the global MPPT controller/processor 312 determines whether $P_3>P_{mpp3}$ for the third DC voltage source string.

If so, for corresponding DC voltage source string, the process proceeds to step 410. At step 410, $P_{mpp}$, $I_{mpp}$ and $I_{ref}$ are respectively set as $P_{mpp}=P$, $I_{mpp}=I$ and $I_{ref}=I_{ref}+dI$, where dI is a corresponding increase in the reference current $I_{ref}$, for the corresponding DC voltage source string. In this regard, for example, the global MPPT controller/processor 308 sets $P_{mpp1}=P_1$, $I_{mpp1}=I_1$ and $I_{ref1}=I_{ref1}+dI_1$ for the first DC voltage source string, the global MPPT controller/processor 310 sets $P_{mpp2}=P_2$, $I_{mpp2}=I_2$ and $I_{ref2}=I_{ref2}+dI_2$ for the second DC voltage source string and the global MPPT controller/processor 312 sets $P_{mpp3}=P_3$, $I_{mpp3}=I_3$ and $I_{ref}=I_{ref3}+dI_3$ for the third DC voltage source string, and the process proceeds to step 414.

If not, the process proceeds to step 412 where, for a corresponding DC voltage source string, $I_{ref}$ is set to $I_{ref}=I_{ref}+dI$, where dI is a corresponding increase in the reference current $I_{ref}$, for the corresponding DC voltage source string. In this regard, for example, the global MPPT controller/processor 308 sets $I_{ref1}=I_{ref1}+dI_1$ for the first DC voltage source string, the global MPPT controller/processor 310 sets $I_{ref2}=I_{ref2}+dI_2$ for the second DC voltage source string and the global MPPT controller/processor 312 sets $I_{ref3}=I_{ref3}+dI_3$ for the third DC voltage source string, and the process proceeds to step 414.

At step 414, the MPPT power system controller 300, such as by the global MPPT controller/processors 308, 310 and 312, determines for a corresponding DC voltage source string, whether $I_{ref}>I_{ref\_max}$, where $I_{ref\_max}$ is a maximum of the reference current for a corresponding DC voltage source string. For example, the global MPPT controller/processor 308 determines whether $I_{ref}>I_{ref\_max1}$ for the first DC voltage source string, the global MPPT controller/processor 310 determines whether $I_{ref2}>I_{ref\_max2}$ for the second DC voltage source string and the global MPPT controller/processor 312 determines whether $I_{ref3}>I_{ref\_max3}$ for the third DC voltage source string.

If not, at step 414, the process returns to step 406. If so, at step 414, the process proceeds to step 416 where the MPPT power system controller 300, such as by the global MPPT controller/processors 308, 310 and 312, sets for a corresponding DC voltage source string, $L_{ref}=I_{mpp}$ where $I_{mpp}$ is a maximum power point current for a corresponding DC voltage source string to optimize an extracted output power of the corresponding DC voltage source string. The current for a corresponding string can be set by the MPPT power system controller 300 at the value of the $I_{mpp}$ current to operate the corresponding DC voltage source string at its $I_{mpp}$. For example, at step 416, the global MPPT controller/processor 308 sets $I_{ref1}=I_{mpp1}$ for the first DC voltage source string, the global MPPT controller/processor 310 sets $I_{ref2}=I_{mpp2}$ for the second DC voltage source string and the global MPPT controller/processor 312 sets $I_{ref3}=I_{mpp3}$ for the third DC voltage source string. From step 416 the process proceeds to step 418 where it is determined if a timer interrupt of the MPPT power system controller 300 is applied to the process. If not, the process returns to step 416 and, if so, the process returns to step 404 to again set $I_{ref}=I_{min}$ and $P_{mpp}=0$, for the corresponding DC voltage source strings and the process then proceeds to step 406, as described.

FIG. 4B illustrates a modified flow chart 400b from the flow chart 400a of FIG. 4A of an embodiment of a process for voltage adjustment and current control for strings of DC voltage sources to optimize extracted output power from corresponding DC voltage source strings in embodiments implementing extracted output power optimizer circuit topologies in power generation systems. Similar to the flow chart 400a, the flow chart 400b determines a maximum power point current $I_{mpp}$ and a maximum power point power $P_{mpp}$ for corresponding DC voltage source strings in optimizing extracted output power, voltage balancing, voltage control, voltage adjustment and current control as can be implemented by global MPPT controller/processors of the MPPT power system controller 300, such as by global MPPT controller/processors 308, 310 and 312 in conjunction with the MPPT system power controller/processor 320, of the Global MPPT, for example. In the flow chart 300b of FIG. 4B, the process begins at step 430. As can be seen from the flow chart 400b, steps 430, 432, 434, 436, 438, 440, 442, 446 and 448 are similar to and correspond to steps 402, 404, 406, 408, 410, 412, 414, 416 and 418, respectively, as described.

However, the capacitor voltage typically can suffer from a high (string) voltage withstand need during the scanning process. In this regard, the modified flowchart 400b of FIG. 4B, as can be implemented by the global MPPT controller/processor of the MPPT power system controller 300, such as by global MPPT controller/processors 308, 310 and 312 of the Global MPPT, in conjunction with the MPPT system power controller/processor 320, is modified from the flowchart of FIG. 4A at step 442 to assist in avoiding decreasing a string voltage for a corresponding DC voltage source string below a minimum allowable voltage ($V_{min}$). For example, if 70% of the open circuit voltage is defined as a minimum limit of the minimum allowable voltage ($V_{min}$), decreasing the string voltage below this value will stop the scanning process and operate the system at a last captured MPP point, which is not necessarily an exact MPP, but it typically corresponds to a relatively highest power within an acceptable voltage range, for example.

In this regard, at step 442 of the flowchart 400b, which corresponds to step 414 of the flowchart 400a, the MPPT power system controller 300, such as by the global MPPT controller/processors 308, 310 and 312, similarly determines for a corresponding DC voltage source string, whether $I_{ref}>I_{ref\_max}$, where $I_{ref\_max}$ is a maximum of the reference current for a corresponding DC voltage source string. For example, the global MPPT controller/processor 308 similarly determines whether $I_{ref1}>I_{ref\_max1}$ for the first DC voltage source string, the global MPPT controller/processor 310 determines whether $I_{ref2}>I_{ref\_max2}$ for the second DC voltage source string and the global MPPT controller/processor 312 determines whether $I_{ref3}>I_{ref\_max3}$ for the third DC voltage source string. If so, the process proceeds to step 446 and proceeds similar to step 416 of the flowchart 400a.

If not, at step 442, the process proceeds to step 444 where the MPPT power system controller 300, such as by the global MPPT controller/processors 308, 310 and 312, determines whether for a corresponding DC voltage source string, $V<V_{min}$, where $V_{min}$ is a minimum allowable voltage for a corresponding DC voltage source string. For example, the global MPPT controller/processor 308 determines whether $V_1<V_{min1}$ for the first DC voltage source string, the global MPPT controller/processor 310 determines whether $V_2<V_{min2}$ for the second DC voltage source string and the global MPPT controller/processor 312 determines whether $V_3<V_{min3}$ for the third DC voltage source string. If not, the process returns to step 434 and proceeds similar to step 406 in the flowchart 400a. If so, the process proceeds from step 444 to step 446 where for a corresponding DC voltage source string $I_{ref}$ is set to $I_{ref}=I_{mpp}$ to operate at a last captured MPP point to avoid decreasing string voltage below the minimum allowable voltage ($V_{min}$).

In this regard, the MPPT power system controller 300, such as by the global MPPT controller/processors 308, 310 and 312, sets for a corresponding DC voltage source string, $I_{ref}=I_{mpp}$ where $I_{mpp}$ is a maximum power point current for a corresponding DC voltage source string. For example, at step 446, the global MPPT controller/processor 308 sets $I_{ref1}=I_{mpp1}$ for the first DC voltage source string, the global MPPT controller/processor 310 sets $I_{ref2}=I_{mpp2}$ for the second DC voltage source string and the global MPPT controller/processor 312 sets $I_{ref3}=I_{mpp3}$ for the third DC voltage source string. Then, from step 446, the process proceeds to step 448 where it is determined if a timer interrupt of the MPPT power system controller 300 is applied to the process. If not, the process returns to step 446 and, if so, the process returns to step 432 to again set $L_{ref}=I_{min}$ and $P_{mpp}=0$, for the corresponding DC voltage source strings and the process then proceeds to step 434, as described.

In the above described examples of embodiments of circuits and topologies for voltage balancing, voltage adjustment, voltage control or current control to optimize extracted output power in the power generation systems, such as those illustrated in FIGS. 1A-1C and 2A-2E, for example, how critical component ratings are from a system cost perspective is an area for consideration as, for example, can depend on the particular use or application, for example. However, component ratings typically can affect power generation system performance, as is evident from the above discussion and simulation results for power generation systems, for example. In addition to a component voltage rating issue during the scanning process, but not typically during system operation of the power generation system, another issue relates to a switch peak current to be equal or substantially equal to a full system current. The latter issue can be a relatively considerable limitation for very large power generation systems and, in this regard, various embodiments of the voltage balancing and extracted output power optimizer circuit topologies can be suitable up to a certain value of power to be generated by a power generation system, for example, as can depend on the particular use or application or on the embodiment of a power system optimizer circuit employed, for example.

Although the switch average current rating is generally relatively low, its peak withstand current can be relatively very critical in embodiments of the voltage balancing and extracted output power optimizer circuit topologies, for example. Typically, switch selection is based on its average current. However, in embodiments of the voltage balancing and extracted output power optimizer circuit topologies the operation can require consideration of how switches for high pulsed currents at very low duty cycles are selected, as well as how such switch selection can affect switch lifetime and system cost for a power generation system. In embodiments of the voltage balancing and extracted output power optimizer circuit topologies when compared with a classical string inverter, all components in the classical string inverter typically see a full string voltage all or substantially all of the time, and typically process a full string current continuously or substantially continuously, for example.

A possible application for embodiments of the voltage balancing and extracted output power optimizer circuit topologies can be in the area of relatively lower power generation systems that have relatively few strings facing in different directions, such as for residential power generation systems, for example. In such lower power generation systems, such as for residential systems, component ratings for the voltage balancing and extracted output power optimizer circuit topologies likely be of relatively lesser significance than in higher power generation systems, and system performance typically can be improved, for example.

As described, switch selection in voltage balancing and extracted output power optimizing can require consideration of how switches for high pulsed currents at very low duty cycles are selected, particularly for large power generation systems. Also, embodiments of voltage balancing and extracted output power optimizer circuit topologies and methods can enable semiconductor switches to carry a corresponding string current without a need for the switches to carry a full system peak current for the power generation system, such as can have applicability in large power generation systems.

As described, embodiments of power generation systems including voltage balancing and extracted output power optimizing topologies, such as those of FIGS. 1A-1C and FIGS. 2A-2E can generally be controlled in two modes, such as by the MPPT power system controller 300 or the generalized system 300a, for example. In a first mode of operation, the embodiments of power generation systems can include circuit topologies as can be implemented and classified as providing voltage balancing circuits and topologies. Such first mode of operation typically can be relatively well suited for power generation systems of series DC power converter outputs placed in parallel combinations, such as DC wind power architectures, as well as can be applied in high voltage direct current (HVDC) multi-terminal applications, for example. In the first operating mode, embodiments of power generation systems providing voltage balancing circuit topologies can assist in mitigating a system circulating current and can assist in reducing individual series converter voltage ratings, for example.

Also, in a second mode of operation, embodiments of power generation systems include circuits and topologies to provide voltage and current adjustment and control and optimization of extracted output power, such as the embodiments of the voltage and current adjusting and control and optimizing extracted output power circuits and topologies illustrated in those of FIGS. 1A-1C and FIGS. 2A-2E can also be applied to a PV power generation system, where string current control, and not necessarily voltage balancing, can be a goal. Such implementation can utilize embodiments of MPP or MPPT algorithms applied as to voltage and current adjustment or string current control, or both, as described, as can as implemented by an embodiment of the MPPT power system controller 300, or by an embodiment of the generalized system 300a, for example. Other embodiments of power generation systems, as described herein, such as in FIGS. 1A-1C and FIGS. 2A-2E can include topologies as can be used for voltage balancing and/or extracted output power optimizing topologies, as described, can also have similar applicability, such as for PV systems for voltage and current adjustment and control applications, such as depending on the particular use or application, as well as embodiments of the MPP or MPPT algorithms applied, for example.

In PV power generation applications, control of a string current at its MPP value per string is typically needed in order to assist in maximizing energy harvest from the corresponding DC voltage source string, such as by controlling string currents at their MPP value in order to match or substantially match string inverter based system performance, for example. Also, there is generally a need for optimizer circuit switch currents to have a peak value equal or substantially equal to a full system current even though typically they only carry a small average value of current based on each corresponding string current. Embodiments of power generation systems including voltage balancing and extracted output power optimizing topologies, such as described herein, can assist in addressing such needs to various extents, such as based on the particular use or application, for example.

Other possible applications for embodiments of power generation systems including voltage balancing and extracted output power optimizing topologies can be in battery charging applications, such as where a current needs to be controlled in strings of batteries that are series/parallel connected, for example.

Also, in PV power generation applications that can place additional limitations on circuit operating conditions, embodiments of power generation systems including voltage balancing and extracted output power optimizing topologies can generally extract relatively more, or relatively equal, power than a central inverter alone and can generally or substantially match, such as in relation to energy harvesting, a full-fledged string inverter solution when properly controlled, such as described herein. However, as described, a degree of improvement over a central inverter solution, or a degree of matching to a string inverter solution, can be typically dependent on the shading/mismatch patterns within the various DC voltage source strings, such as in a power generation system, for example.

Additionally, embodiments of power generation systems including voltage balancing and extracted output power optimizing topologies are also described in Attachment I, in the paper entitled "A New Approach for Increasing Energy Harvest in Large Scale PV Plants Employing a Novel Voltage Balancing Topology", Shehab Ahmed et al., six (6) pages and in Attachment II in the document entitled "Modelling of the three line balancing circuit", four (4) pages, both Attachments I and II are attached hereto and incorporated herein by reference.

It is to be understood that the present invention is not limited to the embodiments described above, but encompasses any and all embodiments within the scope of the following claims.

We claim:

1. An apparatus for voltage balancing and extracting output power from a plurality of parallel arranged direct current (DC) voltage source strings in a power generation system, comprising:
   at least one string voltage balancing and extracted output power optimizer circuit, each voltage balancing and extracted output power optimizer circuit comprising:
      at least one reverse blocking switch adapted to control a current flowing in one or more corresponding DC voltage source strings;
      at least one inductor respectively arranged in series with a corresponding reverse blocking switch adapted to minimize a ripple current flowing in at least one corresponding DC voltage source strings; and
      at least one capacitor communicatively connected to a corresponding at least one reverse blocking switch adapted to construct across a corresponding at least one capacitor a voltage difference between corresponding adjacent ones of the plurality DC voltage source strings,
   wherein at least one voltage balancing and extracted output power optimizer circuit selectively adjusts a voltage generated by and selectively controls a current flowing in corresponding ones of the plurality of DC voltage source strings to operate each DC voltage source string at approximately a corresponding maximum power point (MPP).

2. The apparatus for voltage balancing and extracting output power from a plurality of parallel arranged direct current (DC) voltage source strings according to claim 1, wherein the at least one reverse blocking switch comprises a metal-oxide semiconductor field effect transistor (MOSFET).

3. The apparatus for voltage balancing and extracting output power from a plurality of parallel arranged direct current (DC) voltage source strings according to claim 1, wherein the at least one reverse blocking switch is adapted to control an average string current flowing through a corresponding DC voltage source string and the at least one capacitor is adapted to filter out a high frequency current due to switching of a corresponding at least one reverse blocking switch.

4. The apparatus for voltage balancing and extracting output power from a plurality of parallel arranged direct current (DC) voltage source strings according to claim 1, wherein the at least one reverse blocking switch comprises:
   a plurality of reverse blocking switches adapted to alternatively turn on and off to provide current continuity of an inductor current of a corresponding at least one inductor and to provide a capacitor voltage of a corresponding at least one capacitor of a corresponding at least one voltage balancing and extracting output power optimizer circuit.

5. The apparatus for voltage balancing and extracting output power from a plurality of parallel arranged direct current (DC) voltage source strings according to claim 1, wherein
   the at least reverse blocking switch comprises a plurality of reverse blocking switches to alternatively turn on and off to control an average string current flowing through corresponding ones of the plurality of DC voltage source strings, and
   the at least one capacitor is adapted to filter out high frequency current due to switching of corresponding ones of the plurality of reverse blocking switches.

6. The apparatus for voltage balancing and extracting output power from a plurality of parallel arranged direct current (DC) voltage source strings according to claim 1, wherein the at least one reverse blocking switch comprises a metal-oxide semiconductor field effect transistor (MOSFET).

7. The apparatus for voltage balancing and extracting output power from a plurality of parallel arranged direct current (DC) voltage source strings according to claim 1, wherein the at least one voltage balancing and extracting output power optimizer circuit further comprises:
   at least one diode respectively arranged in series with a corresponding reverse blocking switch adapted to control a direction of current flow.

8. The apparatus for voltage balancing and extracting output power from a plurality of parallel arranged direct current (DC) voltage source strings according to claim 1, wherein the at least one voltage balancing and extracting output power optimizer circuit comprises:
   a plurality of voltage balancing and extracting output power optimizer circuits arranged in a cascaded interconnecting relation associated with respective ones of the plurality of DC voltage source strings.

9. The apparatus for voltage balancing and extracting output power from a plurality of parallel arranged direct current (DC) voltage source strings according to claim 1, wherein the at least one voltage balancing and extracting output power optimizer circuit further comprising:
   a controller including a processor to control operation of the at least one voltage balancing and extracting output power optimizer circuit to selectively adjust the voltage generated by and to selectively control the current flowing in corresponding ones of the plurality of DC voltage source strings to operate each DC voltage source string at approximately the corresponding maximum power point (MPP), the controller being in communicating relation with the at least one reverse blocking switch.

10. A method for voltage balancing voltage balancing and extracting output power from a plurality of parallel arranged direct current (DC) voltage source strings in a power generation system, comprising the steps of:
   controlling by a controller including a processor an operation of at least one voltage balancing and extracted output power optimizer circuit to selectively adjust a voltage generated by and selectively control a current flowing in corresponding ones of the plurality of DC voltage source strings;
   selectively controlling by the controller a current flowing in each of the plurality of DC voltage source strings by controlling operation of at least one reverse blocking switch associated with a corresponding at least one voltage balancing and extracted output power optimizer circuit, each reverse blocking switch associated with a corresponding one of the plurality of DC voltage source strings; and
   selectively adjusting by the controller a voltage difference for at least one capacitor associated with a corresponding at least one voltage balancing and extracted output power optimizer circuit, the at least one capacitor being associated with a corresponding one or more of the plurality of DC voltage source strings to selectively adjust a voltage associated with a corresponding adjacent one or more of the plurality of DC voltage source strings,
   wherein the controller selectively controls at least one of a current flowing in and a voltage associated with corresponding ones of the plurality of corresponding ones of the plurality of DC voltage source strings to operate each DC voltage source string at approximately the corresponding maximum power point (MPP), the controller being in communicating relation with the at least one reverse blocking switch.

11. The method for voltage balancing voltage balancing and extracting output power from a plurality of parallel arranged direct current (DC) voltage source strings in a power generation system according to claim 10, further comprising the steps of:
  filtering by the at least one capacitor of the at least one voltage balancing and extracted output power optimizer circuit a high frequency current generated by switching on and off of at least one corresponding reverse blocking switch; and
  reducing by at least one inductor associated with a corresponding at least one voltage balancing and extracted output power optimizer circuit a ripple current in a corresponding DC voltage source string.

12. The method for voltage balancing voltage balancing and extracting output power from a plurality of parallel arranged direct current (DC) voltage source strings in a power generation system according to claim 10, further comprising the step of:
  selectively controlling by the controller a current and a voltage respectively corresponding to each of the plurality of DC voltage source strings through the at least one voltage balancing and extracted output optimizer circuit to optimize an extracted output power generated by corresponding ones of the plurality of DC voltage source strings.

\* \* \* \* \*